United States Patent [19]
Acks et al.

[11] Patent Number: 5,912,934
[45] Date of Patent: Jun. 15, 1999

[54] UNDERWATER INSPECTION SYSTEM FOR NUCLEAR POWER FACILITIES

[75] Inventors: Robert S. Acks; Arthur E. Vigil; John L. Buchanan, all of San Diego, Calif.

[73] Assignee: Remote Ocean Systems, Inc., San Diego, Calif.

[21] Appl. No.: 08/892,625

[22] Filed: Jul. 14, 1997

Related U.S. Application Data

[60] Provisional application No. 60/020,979, Jul. 15, 1996.

[51] Int. Cl.$^6$ .................................................. G21C 17/00
[52] U.S. Cl. ........................................ 376/248; 376/249
[58] Field of Search ................................ 376/245, 248, 376/252, 452; 235/462

[56] References Cited

U.S. PATENT DOCUMENTS

| | | | |
|---|---|---|---|
| 4,960,984 | 10/1990 | Goldenfield et al. | 235/462 |
| 4,978,917 | 12/1990 | Goldenfield et al. | 324/226 |
| 5,089,213 | 2/1992 | Omote et al. | 376/248 |
| 5,105,346 | 4/1992 | Acks et al. | 362/267 |
| 5,213,410 | 5/1993 | Acks | 362/269 |
| 5,247,154 | 9/1993 | Ahmed | 219/121.83 |
| 5,361,280 | 11/1994 | Omote et al. | 376/248 |
| 5,386,355 | 1/1995 | Acks | 362/267 |
| 5,490,185 | 2/1996 | Dent et al. | 376/268 |

FOREIGN PATENT DOCUMENTS

| | | | |
|---|---|---|---|
| 7-146394 | 6/1995 | Japan | 376/248 |

OTHER PUBLICATIONS

Senoh, M. et al.: "Fuel–Number Recognition by Means of Multidirectional Lighting," *Nuclear Technology*, vol. 72, No. 3, Mar. 1986, USA, pp. 321–327.

Kubo, K. et al.: "Development of Automatic Fuel Number Reader," *Japan Atomic Ind. Forum*, vol. 2, Apr. 14, 1991, Tokyo, Japan, pp. 886–890.

Senoh, M. et al.: "Development of Fuel ID Number Imaging Equipment Using Optical and Ultrasonic Sensors," *Transactions of the American Nuclear Society*, vol. 65, Jun. 7, 1992, USA, pp. 68–69.

Amic, C. et al.: "Identification of Fresh Fuel Assemblies Using Optical Character Recognition," *Esarda 19$^{th}$ Annual Symposium on Safeguards and Nuclear Material Management Proceedings*, May 13, 1997, France, pp. 627–634.

Derwent Patent Abstracts of Japan, Furuya et al, Method for Identifying Control Number of Nuclear Fuel Assemblies, JP 7–146394, Jun., 1995.

*Primary Examiner*—Charles T. Jordan
*Assistant Examiner*—M. J. Lattig
*Attorney, Agent, or Firm*—Brown, Martin, Haller & McClain

[57] ABSTRACT

A nuclear fuel identification system for use in nuclear power plants has an imaging system having a video camera and an array of illuminators surrounding the video camera and positioned to shine onto a nuclear fuel cell. The illuminators are sequentially activated to provide a series of images each having a different shadow pattern. These images are then digitized and stored until a complete set of the images are available. At that time, the images are superimposed and optimized for improved contrast. By viewing the distinct shadow patterns on the nuclear fuel cell, the identifying markings are readily visible. In addition to the shadow imaging system, a variety of laser devices are used to accomplish similar image generating functions. Such laser devices include a laser scanner, a distance laser device, an interferometer, a holographic interferometer, and a bi-refringent crystal prism.

37 Claims, 11 Drawing Sheets

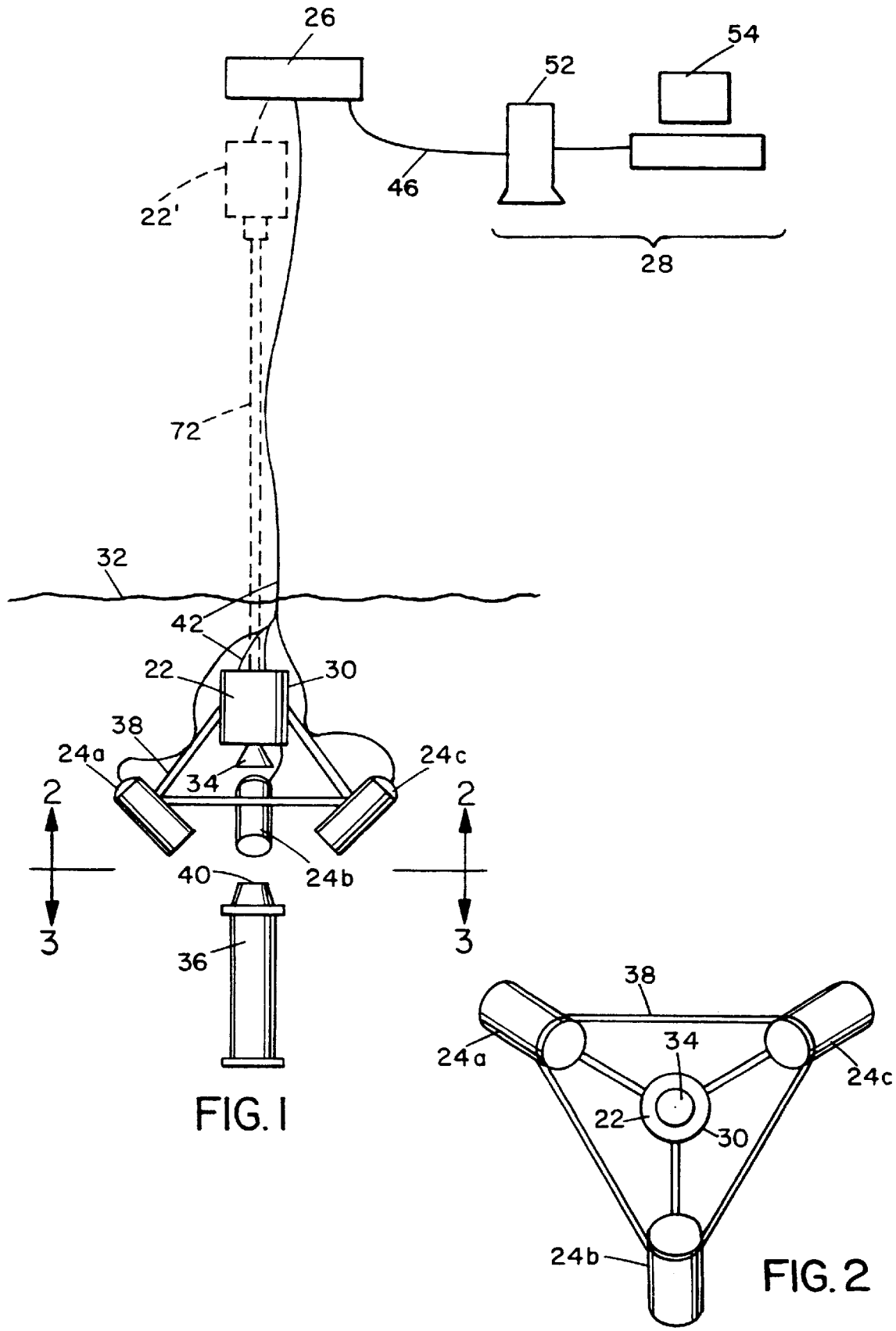

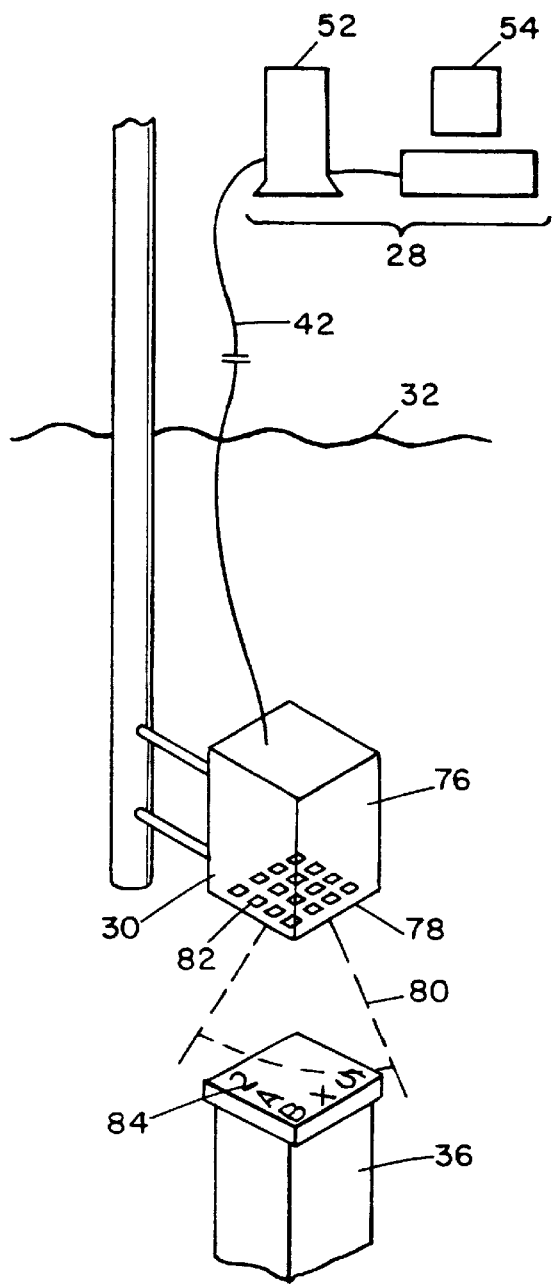
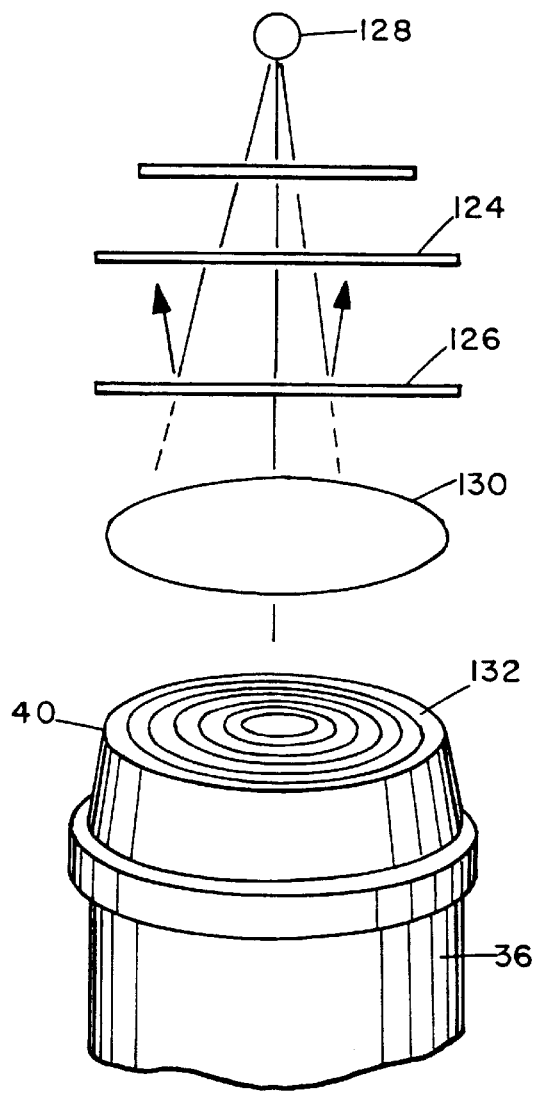
FIG. 6
FIG. 14

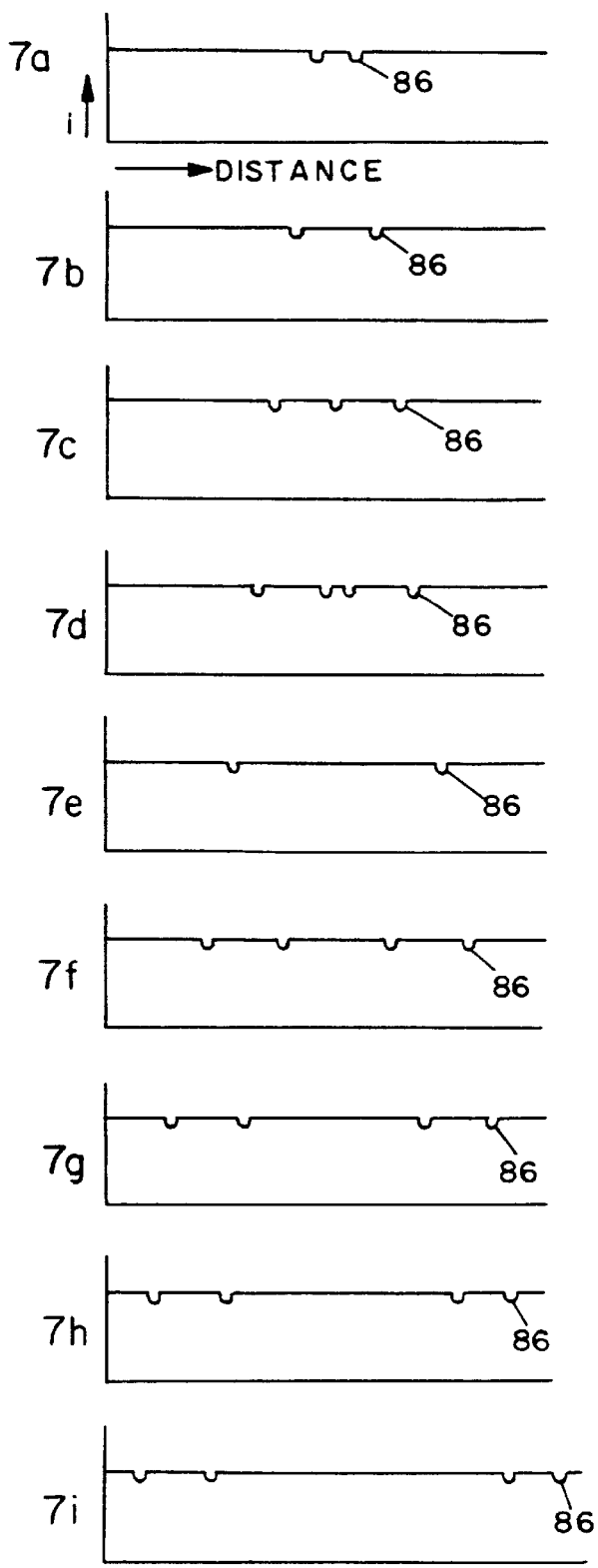
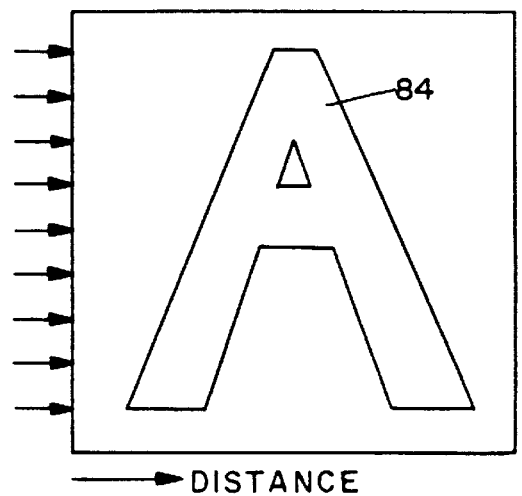
FIG. 8
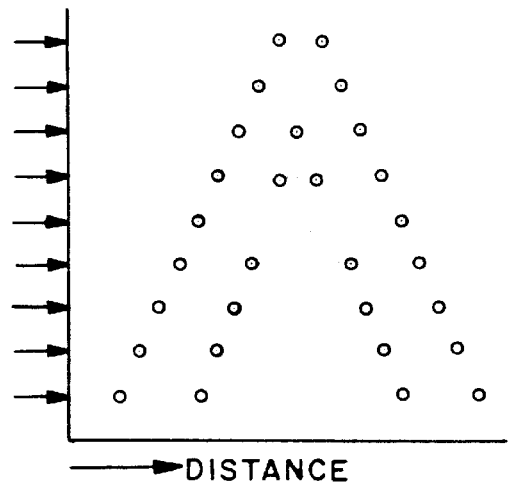
7j
FIG. 7

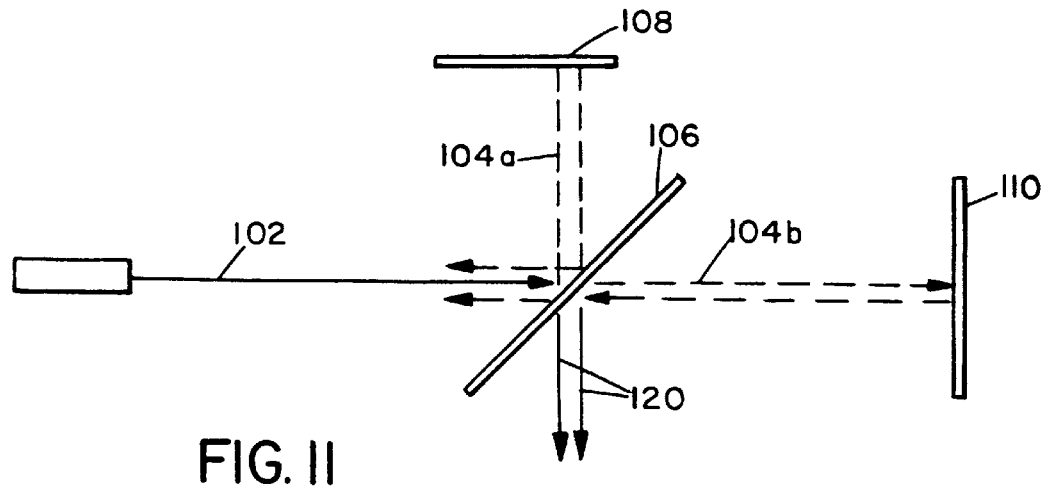
FIG. 11
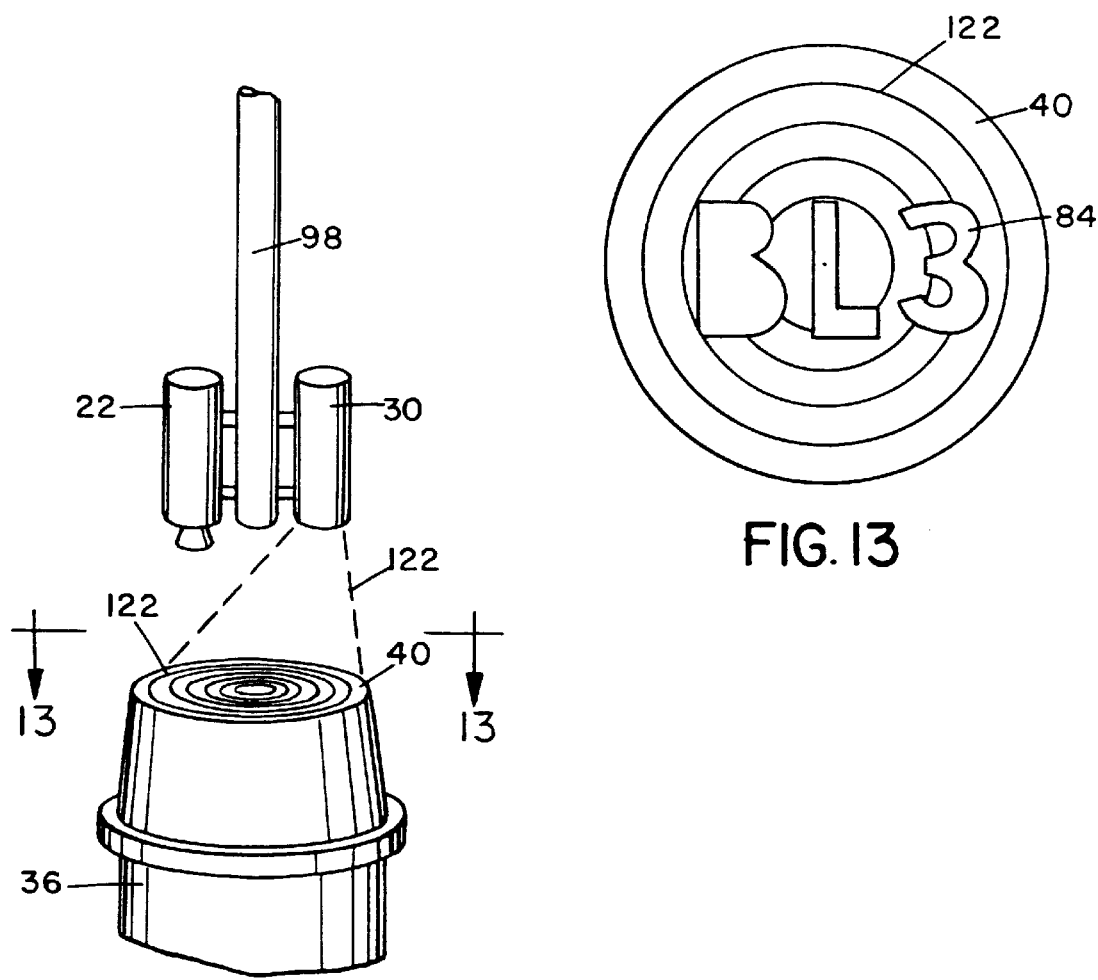
FIG. 12
FIG. 13

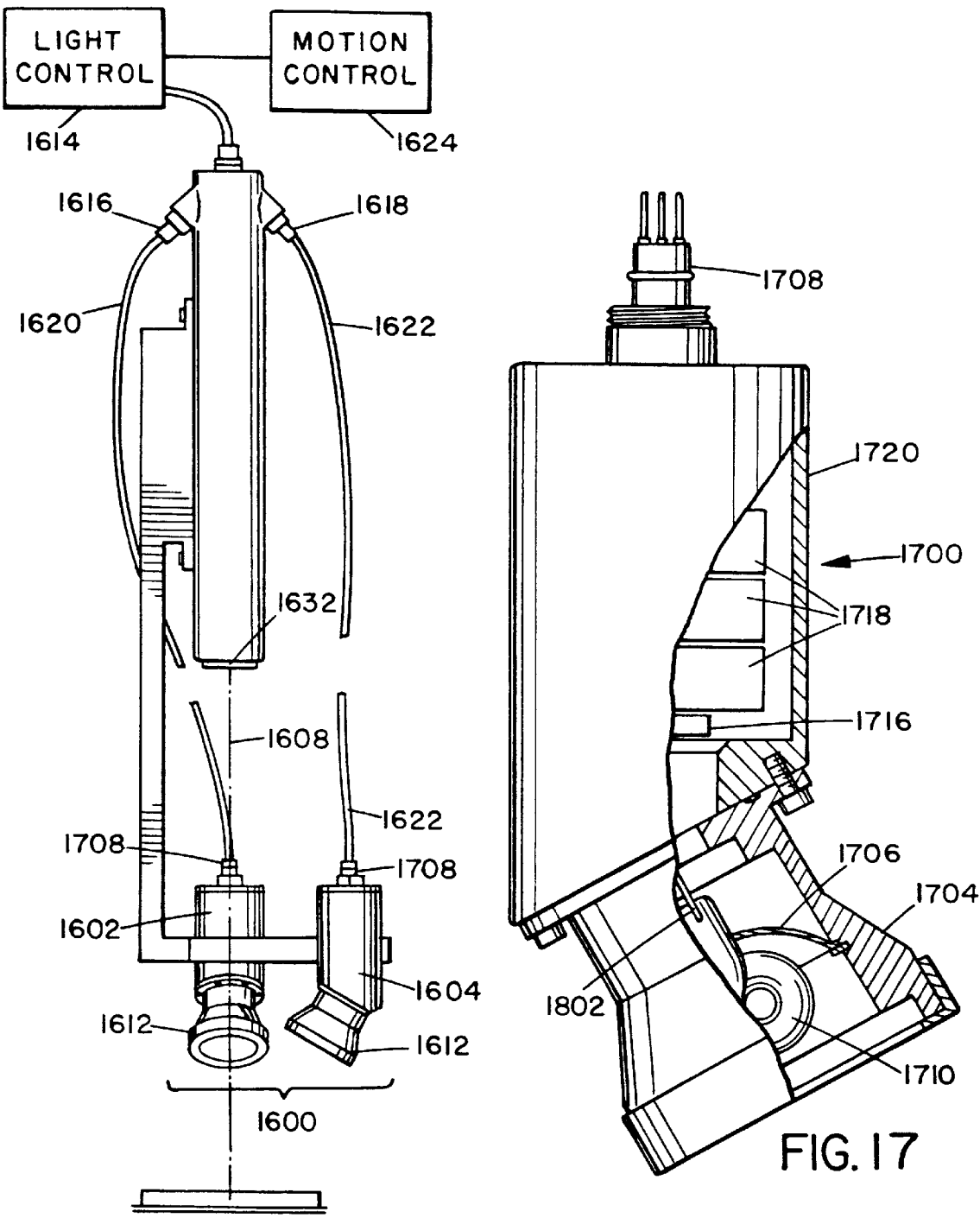
FIG. 16
FIG. 17
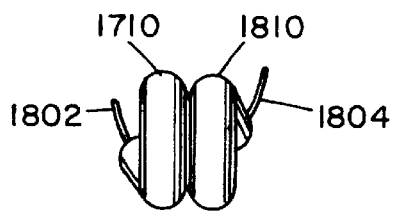
FIG. 18

UNDERWATER INSPECTION SYSTEM FOR NUCLEAR POWER FACILITIES

This application claims priority under 35 U.S.C. §119(e) to U.S. provisional application Ser. No. 60/020,979, filed Jul. 15, 1996.

FIELD OF THE INVENTION

The present invention relates to inspection systems for use in underwater environments. More specifically, though not exclusively, the present invention relates to the inspection and/or identification of nuclear fuel rod assemblies and other surfaces which are submerged in a hazardous underwater environment, such as a reactor core or spent fuel storage pool in nuclear power generating plants.

BACKGROUND OF THE INVENTION

Facilities that generate power by nuclear fission often use water for containment of the reaction rate and provide a certain amount of radiation shielding of the fuel in the reactor core (in pressured water and boiling water-type reactors), and to store spent fuel cells. A typical pressure water reactor (PWR) can have on the order of 280 fuel cells in its reactor core. A boiling water reactor (BWR) can have 500 fuel cells in use and in storage. A spent fuel pool can have as many as 5,000 units at any given time. Strict governmental regulation requires that the specific location of each fuel cell in a facility be known at all times. Failure to comply, even in the case of a minor variation, can result in substantial fines.

The operation and maintenance of nuclear facilities requires that the fuel cells contained in the reactor be periodically inspected and replaced. In both PWR and BWR facilities, the reactors are typically refueled every twelve to eighteen months. The refueling process removes spent fuel to the spent fuel pool, relocates existing fuel cells within the reactor core, and inserts new fuel cells. This process involves much more than simply replacing spent cells with new cells, since a significant "shuffling" of the fuel cells already within the reactor must occur in order to balance the radiation level across the reactor core to maintain uniformity. In order to comply with the strict governmental regulations, as well as to enable identification of fuel cells to determine their appropriate position within the core, means must be provided for in situ identification of each individual fuel cell with minimum exposure of personnel to dangerous radiation levels. This requires that the fuel cells be identified while still submerged within the water in the reactor containment or spent fuel pools. This presents a significant problem, however, since the depth of the water, at least in the containment pool, is on the order of 60 feet.

The industry standard is for the fuel cells to be identified with an alphanumeric serial number which is stamped, milled or engraved on the top surface of the fuel cell, or on a bail extending partially across the top of the unit. Typical depths for new characters can be 0.5 to 1.0 mm. Thus, in order to identify a particular fuel cell, it is essential that the serial number be both visible and intelligible. On new fuel cells, the contrast between the background surface and the characters in the serial number is good, and the serial number can easily be read using a common video camera, such as a camcorder. However, this contrast degrades over time due to the enhanced corrosion and/or oxidation of the surface that is caused by the radiation, and sediment buildup on the surfaces of the fuel cell, with the characters becoming as shallow as 0.07 mm.

A number of identification systems have been developed which are intended to allow the identification of fuel cells. For example, U.S. Pat. No. 4,960,984 ('984 patent) which issued to Goldenfield for an invention entitled "Method and Apparatus for Reading Lased Bar Codes on Shiny-Finished Fuel Rod Cladding Tubes," teaches the identification of nuclear fuel rod tubes that are encoded with a bar code by scanning the bar code with a bar code reader. This method requires marking a bar code on the fuel cells in addition to the industry standard alphanumeric code, which may be possible for newly manufactured cells, but could prove very difficult for used fuel cells (spent or in use). Further, the system and method of the '984 patent does not allow identification of a fuel rod tube while the tube is submerged within the reactor pool. Instead, a sophisticated machine is described which receives the fuel rod tube, and directs a laser beam towards the bar code etched in the tube. This laser beam is reflected back to the beam source for decoding to yield the identification information for the fuel cell. While this system may be capable of accurately identifying the fuel cell tube using a pre-existing engraved bar code, it is incapable of obtaining such identification while the fuel cell is submerged within the reactor pool.

Another fuel cell identification system is briefly disclosed in U.S. Pat. No. 5,490,185 ('185 patent), issued to Dent, et al., for an invention entitled "System for Automatic Refueling of a Nuclear Reactor," which includes the use of an optical scanner to identify the bar code or alphanumeric code. While this system includes video capability for identification of the fuel cell while still submerged within the reactor pool, the video feature is described simply as a remotely operated video camera which is attached to the fuel handling equipment. Without special considerations for contrast enhancement, corrosion on the outside surface of the nuclear fuel cells and the buildup of corrosive materials on the surface of the nuclear fuel cell will inhibit the video determination of any identifying markings.

Yet another identification system is disclosed in U.S. Pat. No. 5,089,213 ('213 patent), issued to Omote, et al., entitled "Nuclear Fuel Assembly Identification Code Reader." The '213 patent discloses the use of a combination of a camera and an ultrasonic wave sensor for what is described as a more reliable process for identification of the fuel cell. The device disclosed in the '213 patent combines the data from the camera and the acoustic device to provide the identification, requiring a relatively complex processing program. The two different reading techniques complement each other in an effort to overcome the inadequacies of each system individually. Thus, a significant loss in contrast in the characters would require the system to rely almost exclusively on the acoustic component of the system. The combination of the processing requirements and the multiple independent detection components would make this system relatively complex and expensive In light of the above-stated inadequacies of the prior art, it would be desirable to provide a system and method for in situ underwater inspection of the nuclear fuel cells in reactor pools and spent fuel pools that is capable of reading existing industry-standard identification characters in which the system is capable of reading the characters in spite of the inevitable degradation of the characters caused by corrosion. It is to such a system that the system and method disclosed herein is directed.

SUMMARY OF THE INVENTION

It is an object of the present invention to provide an identification system which is capable of in situ identification of a nuclear fuel cell while the cell is submerged within the reactor pool.

It is a further object of the present invention to provide an identification system which generates a superior image for use in identifying a submerged nuclear fuel cell with a high degree of certainty.

It is still another object of the present invention to provide a nuclear fuel cell identification system which is capable of identifying the proper placement and height of the nuclear fuel cells as positioned within the reactor itself.

It is another object of the present invention to provide a nuclear fuel cell identification system which is capable of maintaining inventory records of the nuclear fuel cells within the reactor and spent fuel pool.

It is still another object of the present invention to provide a nuclear fuel cell identification system capable of automatically identifying a fuel cell identification marking using an optical character recognition scheme.

It is a further object of the present invention to provide a nuclear fuel cell identification system that is capable of identifying any imperfections or surface defects in the nuclear fuel cell and any surface within the pool.

It is another object of the present invention to provide a nuclear fuel cell identification system that is capable of the automated identification and processing of the nuclear fuel cells.

In an exemplary embodiment, the underwater inspection system for nuclear facilities has a video camera equipped with a fiberscope which terminates to a camera lens. The fiberscope is several feet long and conveys light from the camera lens to the video camera. The camera lens may be submerged in the pool containing the nuclear fuel for a close view of a nuclear fuel cell, while the camera remains at a distance such that radiation exposure is minimized. An anchoring bracket attaches to the camera lens to support a number of illumination lamps. Each of these lamps is angled downward towards a single location such that the object within that location would be illuminated from several different angles. The present embodiment includes three such lamps spaced 120 degrees apart generally in a common plane, however, any combination and arrangement of multiple lamps that provides illumination from different directions would be appropriate. The lamps can be selectively and sequentially illuminated to produce shadows from multiple sides of the target, thereby improving the contrast between the targeted markings and the surface in which they lie by enhancing the edges of the markings.

The video camera is electrically connected to a power supply and control unit which provides all power to the camera, receives the electronic video signal, and controls the illumination of the illuminators. The illuminators are sequenced on and off such that by viewing the video output of the video camera, the fuel cell image will be constantly varying between three views, each associated with the illumination of a single illuminator.

The video camera creates an electronic video signal which is received by the power supply and control unit. Within the control unit the video signal is conditioned and amplified for transmission to a frame grabber which is housed in a computer system. The frame grabber digitizes the video signal thereby facilitating digital analysis of the video image. By alternating the illumination of the lamps, for example, by strobing the lamps, the nuclear fuel cell being viewed is illuminated and the corresponding image is digitized. The same process is repeated for each of the illuminating lamps, resulting in a distinct image corresponding to each lamp. Once the images have been digitized, there is an option as to whether the images are first combined, then the resultant image optimized, or whether the images are individually optimized and the optimized images are then combined. In either case, the resultant image is more clear and has considerably more resolution than a standard video image of the top of a nuclear fuel cell.

The computer system, in addition to housing the frame grabber, is capable of identifying and tracking each nuclear fuel cell within the nuclear reactor. This identification and tracking is accomplished by maintaining a log and/or generating a map of the nuclear fuel cell serial numbers and corresponding locations within the nuclear reactor and spent fuel pools. Thus, it is possible to identify a nuclear fuel cell and determine the length of time the fuel cell has been in the reactor, the precise position of the fuel cell, the approximate enrichment level of the fuel cell, and any other relevant data regarding that particular fuel cell.

The operation of the first exemplary embodiment consists of lowering the camera and illumination lamps into the pool and positioning them over a nuclear fuel cell for identification. Such positioning can easily be accomplished by mounting the camera lens and illuminators on the telescoping arm of the fuel handling machine. Then, when the telescoping arm extends down into the reactor pool, the fuel cells may be viewed and identified with a high degree of certainty prior to engagement by the fuel handling machine. Once the camera lens is positioned above a fuel cell, the multiple illuminators are sequentially activated to create a series of shadows on the surface of the cell. These shadows are created by emphasizing the edges of the imprinted identification numbers and characters which constitute the fuel cell's serial number. As each illuminator is activated, the shadow image is conveyed from the camera lens through the fiberscope to the video camera which is preferably at a distance sufficient to significantly reduce the radiation levels impinging upon the camera. The output from the video camera is fed into a frame grabber which digitizes the video image and stores the video information on a computer system. This illumination and digitization process is repeated for the remaining illuminators and results in a set of digitized images in the computer having distinct shadow characteristics. Once the digitization is completed, the three images are combined and optimized to yield an image of the fuel cell having an enhanced image of the identification numbers.

In an alternative embodiment, a camera equipped with multiple illuminators is replaced by a laser scanning head which is positioned on the telescoping arm. This laser scanning head can use a variety of techniques for scanning and improving the resolution of a serial number image. Such techniques, for example, include the use of a distance-determining laser, an interferometric laser system, or holographic interferometry. In each such technique, the image of the serial numbers is improved over traditional video techniques. Using the distance determining laser, the entire top surface of the fuel cell is raster scanned with a laser beam, with the laser light being reflected to a photodetector, which may include a CCD detector. The laser is pulsed and precise timing analyses provides an accurate distance reading to the reflecting surface. Combining each point of reflective, the general topography of the fuel cell may be determined thereby revealing the increased depths resulting from the presence of the serial number of the fuel cell. Similar results may be achieved using a fan-shaped beam and a one- or two-dimensional CCD array which can detect variations in the reflections at discrete points.

An interferometer produces an array or grid of interference lines which may be projected onto the surface of the fuel cell in order to determine the topography of its surface. A camera is then used to generate an image of the array of interference lines. Variations in the spacing between the interference lines correspond to displacements in the surface being inspected. By mapping the variations in the line spacing in the collected image, the topographic variations resulting from the characters to be read can be seen, allowing identification of the fuel cell.

BRIEF DESCRIPTION OF THE DRAWINGS

The present invention will be better understood from the following detailed description of a preferred embodiment, taken in conjunction with the accompanying drawings, in which like reference numerals refer to like parts, and in which:

FIG. 1 is a perspective view of the present invention as shown with three illuminators mounted to the video camera;

FIG. 2 is a bottom view of the first embodiment taken along line 2–2 of FIG. 1;

FIG. 6 is diagrammatic side view of a third embodiment of the Nuclear Fuel Inspection System of the present invention;

FIGS. 7a–f is a graphical representation of the reflected laser intensity as a function of distance;

FIG. 8 shows the alpha-numeric character being scanned by the laser scanner;

FIG. 11 is a diagrammatic view of a Michelson interferometer which is included in the fifth embodiment of the present invention;

FIG. 12 is a diagrammatic view of the interferometer embodiment of the present invention;

FIG. 13 is a top view of the interference pattern as superimposed on the surface of the fuel cell;

FIG. 14 is a diagrammatic view of a Fabry-Perot interferometer;

FIG. 16 is a diagrammatic view of an alternate embodiment using multiple light sources;

FIG. 17 is a diagrammatic side view, partially cut away, of a light source of the embodiment of FIG. 16;

FIG. 18 is a diagrammatic view of an illuminating element for the light source of FIG. 16;

DESCRIPTION OF THE PREFERRED EMBODIMENTS

Figure 3A:
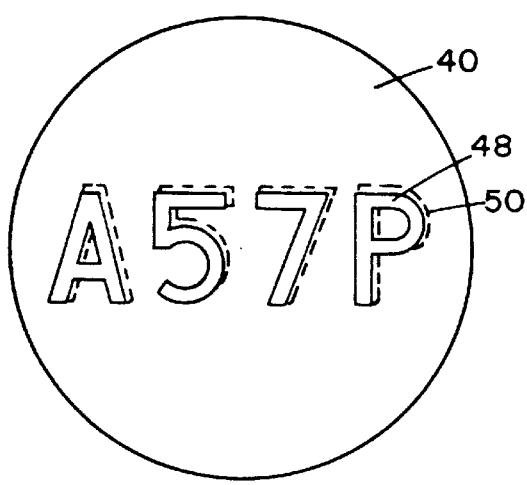
FIGS. 3a–f are views of the top of a nuclear fuel cell being illuminated with the first embodiment of the Nuclear Fuel Inspection System.

As illustrated in FIG. 1, the underwater inspection system for nuclear facilities is shown and generally designated 20. As shown, the first embodiment of the present invention includes a video camera 22, illuminators 24a,b,c (for a three illuminator system), a power supply and control unit 26, and a computer system 28 equipped with a video frame digitizer (not shown). The video camera 22 lies in an optical path running vertically, generally perpendicular to the upper surface of the fuel cell. Camera 22 is mounted in a waterproof housing 30 which enables the camera to be submerged into the reactor pool 32. In most instances, since such submersion may reach depths of 60 feet, it is preferred that the housing 30 be capable of withstanding several atmospheres of pressure. In addition to being water-proof and pressure-tolerant, it may also be desirable to construct the housing 30 of radiation resistant and/or tolerant material. It may be possible that the significant radiation attenuation provided by water may permit the use of a conventional CCD camera if the camera is kept at distances of greater than one meter from the fuel cells, however, a radiation tolerant camera system is preferred.

The lens 34 of the camera system should be formed from radiation tolerant materials, depending upon the proximity of the lens to the fuel cells. Since common optical lens materials are known to darken with exposure to radiation, formation of the lens from, for example, cesium doped glass, or other radiation-tolerant materials, as are known, will make the lens resistant to discoloration arising from long-term exposure to radiation.

Where the electronics of the camera 22 will be situated in relatively close proximity to the fuel cells, it is preferable to shield the electronics from radiation. For example, the electronics may be placed within a small lead box within the housing 30. As is known, due to the levels of radiation within the reactor pool 32, electronic components within the video camera 22 should exclude CMOS circuitry due to its susceptibility to radiation effects. On the other hand, bipolar microelectronics, significantly more radiation tolerant than CMOS, could be used with moderate radiation shielding of the housing. In addition to bipolar electronics, radiation hardened circuitry could be used to greatly increase the life expectancy of the video camera if submerged within the pool containing the fuel cells in relatively close proximity to the cells.

The camera lens 34 in the first embodiment is capable of a 12:1 zoom, which allows the video camera 22 to be maintained at a greater distance from the source of radiation within the pool 32. Since the radiation level in the pool decreases significantly at greater than one meter from the fuel cell 36, the life of the video camera may be prolonged by maintaining at least this distance between the camera and the radiation sources.

Attached to the exterior of the video camera 22 is an anchoring bracket 38 which forms a triangular-shaped frame for mounting the three illuminators 24a,b,c of the first embodiment in a common plane centered along the optical path of camera 22. This frame is sufficiently rigid to maintain the position of each illuminator with respect to the video camera, which is located at the center of the triangle, so that each illuminator is directed at the surface 40 of a fuel cell 36 immediately in front of the video camera 22. When the illuminators 24 are directed towards the fuel cell 36 and activated, a series of shadows are created by the edges of the imprinted serial number.

Due to the limited area allowed for movement and operation of the illumination and imaging system within the pools, the array should be as compact as possible. Projections from the center should be minimized so that they do not get caught on any structures within the pool.

Referring briefly to FIG. 2, the camera lens 34 is shown with the illuminators 24 evenly spaced about the lens with 120 degree spacing. This positioning provides for illumination of the serial number marking on a fuel cell from three distinct positions. Although the preferred embodiment as shown incorporates three illuminators, it should be noted that any multiple of illuminators could be used. In fact, as more illuminators are added to the system, more shadow images can be created from the fuel cell surface when the illuminators are sequentially activated.

Returning to FIG. 1, the power supply and control unit 26 is electrically connected to both the video camera 22 and the illuminators 24. The power supply and control unit provide all required voltages to the video camera as well as synchronizing the activation of the illuminators such that the fuel cell 36 is illuminated by only one light source at a time.

A video cable 42 extends from the back of the video camera 22 to the power supply and control unit 26 where the video signal is amplified and conditioned for transmission to the computer system 28. The video camera produces an electronic signal which represents the video image in standard NTSC format. Other formats, however, may be used to provide greater resolution of the image. Such formats could include RS-170, PAL, SECAM, CCIR, S-Video, or any other video format available. Once the video signal is created and sent to the power supply and control unit 26, the amplitude of the signal is adjusted to the proper level and the signal is fed into the frame grabber board (not shown) within the computer system via the video and timing cable 46. In addition to the video image, the video and timing cable 46 carries digital information identifying which illuminator 24 corresponds to a given video image.

Referring now to FIGS. 3a–f, the upper surface 40 of a fuel cell 36 is shown as illuminated by three illuminators 24 of the first embodiment. FIG. 3a shows the alpha-numeric serial number 48 of a nuclear fuel cell 36. As shown, the edges of the characters and letters of the serial number are clearly identifiable. Following months of exposure to radiation and deterioration, the characters within the serial numbers become more difficult to discern, making them nearly impossible to identify by simple observation using a video camera. However, by viewing the characters using shadows generated from multiple angles, the worn edges can still be emphasized, and the likelihood of identification is greatly improved.

FIG. 16 illustrates a second embodiment of the illumination system using multiple light sources. Illumination assembly 1600 utilize two light sources 1602,1604 which are positioned generally within the range of 90° to 110° from each other within a plane centered on optical axis 1608. Hoods 1610,1612 of light sources 1602,1604 are angled to direct their emitted light toward an area generally centered on axis 1608. Light sources 1602, 1604 are firmly mounted off-axis relative to axis 1608 so that they do not obscure or otherwise interfere with the field of view of camera lens 1632. In the second embodiment, lens 1632, centered on an optical axis coincident with axis 1608, has a 50 mm focal length. Lens 1632 may also including a zoom capability using conventional zoom technology to adjust for offsets which may occur during movement of the assembly to scan the fuel cells. As in the first embodiment, lens 1632 is preferably formed from radiation tolerant materials to prevent discoloration of the lens material.

The detailed structure of light sources 1602,1604 is shown in FIG. 17. Light source 1700 is preferably a radiation tolerant strobe light mounted within a rigid housing 1702 with a hood 1704 mounted at a fixed angle, in this case 30°, with respect to the axis of housing 1702. Underwater connector 1708 provides electrical connection with the remotely-located timing signal generator for the light source. Within hood 1704 is a semi-spherical reflector 1706 which reflects and directs light generated from flash tube 1710. Flash tube 1710, which is shown in FIG. 18, is constructed using conventional flash lamp technology, e.g., gas discharge tubes, with filament electrodes 1802,1804 for exciting the gas, such as xenon, a capacitor 1716 for storing charge, and a trigger transformer 1718. The external ends of filament electrodes 1802,1804 may be soldered or otherwise attached to a printed circuit board 1720 onto which capacitor 1716 and transformer 1718 are mounted. Adaptation of the conventional flash lamp technology for use in the radioactive environment is achieved by forming flash tube 1710, which is shaped as a spiral, from a synthetic quartz tubing ($SiO_2$) such as SUPERSIL™, made by General Electric Company. Generally, the tubing 1810 used for flash tube 1710 should be radiation tolerant so that it does not darken upon exposure to radiation. Any synthetic quartz product, or other light transmitting materials meeting this criteria may be substituted.

Referring again to FIG. 16, light sources 1602,1604 are activated by strobe timing signals generated in lighting controller 1614, which is located remotely from the light sources. Lighting controller 1614 may be integral with an overall imaging system controller, or may be separate from, but connected to, the imaging controller to synchronize the strobe flashes with the movement of the imaging/illumination system. Radiation tolerant underwater connectors 1616,1618 and cables 1620,1622 provide connection for conducting the timing (trigger) signals from controller 1614 to light sources 1602,1604. In order to allow imaging "on-the-fly" while the imaging system is moving over the fuel cells, the lighting controller 1614 is synchronized with the scanning controller 1624 that governs the rate of speed of movement of the system. (See, e.g., the x-y translation system illustrated in FIG. 4.) At a flash rate of four flashes per second, the imaging system can move at a rate of approximately 2.5 cm per second and generate images of sufficient quality to reliably read the identification numbers on the fuel cells. The use of quick pulses of light that are provided by the strobe lights facilitates the creation of multiple (two or more) identical images of the same target from the same angle of illumination while the system is being moved over the fuel cells. The multiple snap shots that are used for collecting the same image are averaged, enhancing the image by allowing filtering of incoherent noise which may appear in one snap shot but not in another, thus providing an improved signal-to-noise (SNR) ratio. Improvement in SNR further facilitates the use of optical character recognition techniques, as are known in the art.

Figure 3B:
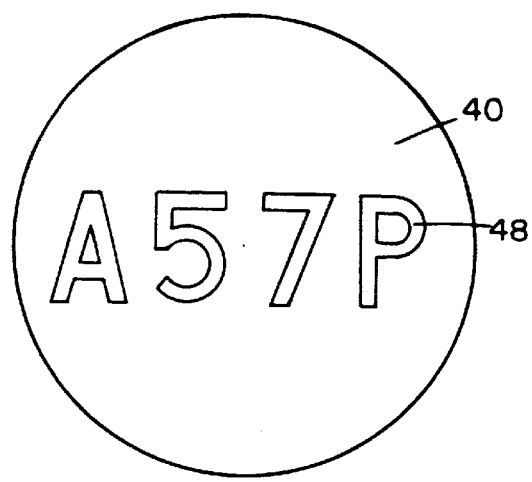

Referring now to FIG. 3b, the alpha-numeric serial number 48 is shown as illuminated by the first illuminator 24a located to the lower left of the fuel cell surface 40. As a result of the illuminator being directed to the surface of the fuel cell at an angle, a series of shadows 50 are created from the raised characters and number of the serial number. These shadows 50 are indicated on the figure as dotted lines adjacent the surface causing the shadow, and provide for an enhanced clarity of the edges of the alpha-numeric characters. As the fuel cell 36 is illuminated by the first illuminator, the power supply and control unit signals the frame grabber within the computer system 28 to digitize the video image. As a result, the frame grabber digitizes the appropriate video image and stores the digital information in a captured buffer cell corresponding to the first illuminator 24a. Included within the image grabber control software is an automatic gain control (AGC) feature, which is known in the art, particularly in the area of optical character recognition. The AGC capability provides adjustment for variations in the reflectivity of the fuel cell surface.

Figure 3C:
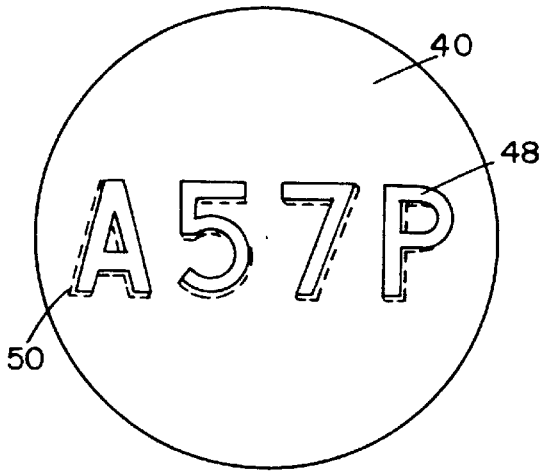

Referring now to FIG. 3c, the subsequent view of the alpha-numeric serial number 48 as illuminated by the second illuminator shows a completely different set of shadows than in FIG. 3b due to the fact that the second illuminator 24b is located directly above the fuel cell 36, 120 degrees away from the first illuminator. As in FIG. 3b, the shadow created by the second illuminator further enhances various edges of the alpha-numeric characters of the serial number 48. Once the second illuminator 24b is activated, the power supply and control unit 26 trigger the frame grabber to digitize the video image. Once triggered, the frame grabber digitizes the video image from the video camera and stores the digital information in the buffer cell corresponding to the second illuminator 24b.

Figure 3D:
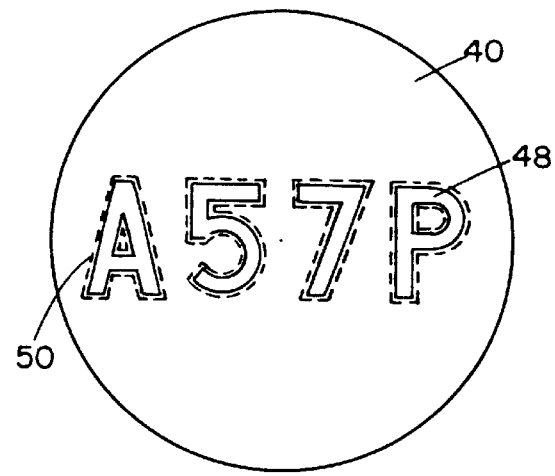

As in FIGS. 3b and 3c, FIG. 3d shows the shadow created by the third illuminator 24c. The third illuminator is located 120 degrees from both the first and second illuminators, and thereby further enhances the edges of the alpha-numeric characters of the serial number 48. As before, once the third illuminator is activated, the power supply and control unit 26 trigger the frame grabber to digitize the video image, which digitizes the image and stores the digital information in the buffer cell corresponding to the second illuminator.

Once all of the buffer cells contain a digitized image of the fuel cell serial number from various directions, the images are optimized and combined to form a single image. The optimization process may be performed on each individual digitized image, or it may be performed on the single image made up of the first, second, and third illuminator images. In the preferred embodiment, multiple images are averaged for a single "image" corresponds to a particular illuminator. Where an the optimization process is performed on each illuminator image, the digital information is analyzed and optimized to provide the best shadow definition available. Averaging of multiple snap shots permits a filtering of portions of the image which do not carry over from one snap shot to the next, allowing incoherent noise to be reduced. Such an optimization process includes identification of any spurious video information present in the buffer cell, as well as image contrast enhancement. As a result of the optimization process, the resulting image information is enhanced.

Figure 3E:
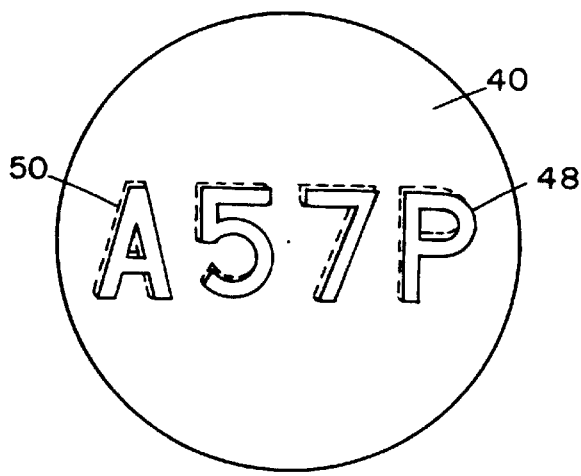

After each of the separate images corresponding to the illuminators have been optimized, the optimized images are then merged to form a single image. Such merging procedures are known in the art and are commonly achieved using bit-mapped images, with one of the bit-mapped images being mapped onto another image by transforming it to correspond to, e.g., overlay, the second image. The merged image is then sent from the central processing unit 52 of the computer system 28 to the monitor 54. Once the combined image is displayed on the monitor, the operator of the system is provided with an enhanced image of the surface of the nuclear fuel cell 36, as shown in FIG. 3e. As an alternative to the preceding sequence, each of the three images could first be combined into a single image for optimization of the combined image. While the result may appear substantially similar to the image created from the independently optimized images, the former method is preferred since the definition of the image when the images are optimized separately is generally better.

The software which controls the frame grabber is a modified version of a commercial image digitizer software package available from EPIX, Inc. of Buffalo Grove, Ill. The EPIX software has been modified to accept a trigger signal from the power supply and control unit 26 which indicates which illuminator is activated to ensure that a given image is stored in the proper memory buffer. Thus, by having the control unit 26 sequence through the illuminators, the frame grabber automatically digitizes each image and stores the digitized image in the appropriate memory buffer corresponding to each illuminator.

The processing and control software of the present invention uses a TTL trigger signal, which synchronizes the illumination of the light source, the camera and the movement of the translator which supports and moves the camera. Included in the software is an x-y image offset correction factor which, based upon the velocity and direction of the camera movement, can correct for the displacement between snap shots which results from the continuous movement of the translator. The software includes false color capability, which allows the color of the image to be changed by the user as needed to enhance contrast between the target object (serial number characters) and the background. Integration of the multiple snap shots to produce a high quality, high contract image for optical character recognition is achieved using a "smart" divisor technique to enable viewing of the full range of light to dark serial numbers. In this method, the image is analyzed by dividing it into a number of grids, for example, a 3×3 grid, and separately analyzing each grid. Based upon the separate analyses, an appropriate divisor is selected for each grid. The selected divisors are then adjusted as needed to minimize discontinuities at the boundaries between the grids. Alternatively, a fixed divisor may be used, however, the full brightness range may be difficult to cover. A highly accurate method of integration would be to analyze the image and determine which portions of the image hold light and dark parts, then apply divisors accordingly. However, since this solution requires recognition of the parts, it may be computationally intensive, requiring a significant execution time, and may be highly sensitive to unique conditions in different reactor cores.

In the preferred embodiment, the image processing software is written in C/C++/Java language to facilitate updates and upgrades, and runs in an appropriately-programmed IBM PC-compatible personal computer using a Windows 95™ operating system, providing graphical interfaces with mouse-selectable menus and tool bars, and ease of data storage to memory. The software allows modification of the trigger signal delay and the starting field. The same PC may be used to provide all of the control, illumination and image processing, or may be set up to receive input from a separate controller for the operation of the fuel cell handler. Such input will include the location and translation velocity of the fuel cell handler.

It should be noted that there are a number of commercially-available programs that are substantially equivalent to the EPIX software available. Such equivalent products include, for example, products made by Colorado Video, Inc., Coreco, Inc., Data Translation, Inc., Matrox Electronic Systems, Ltd., and Optimas Corporation. While the software packages from these other manufacturers have not been actually adapted for use in the present invention, those skilled in the art will recognize that such adaptation can be readily achieved using similar modifications to those made to the EPIX software.

Figure 21:
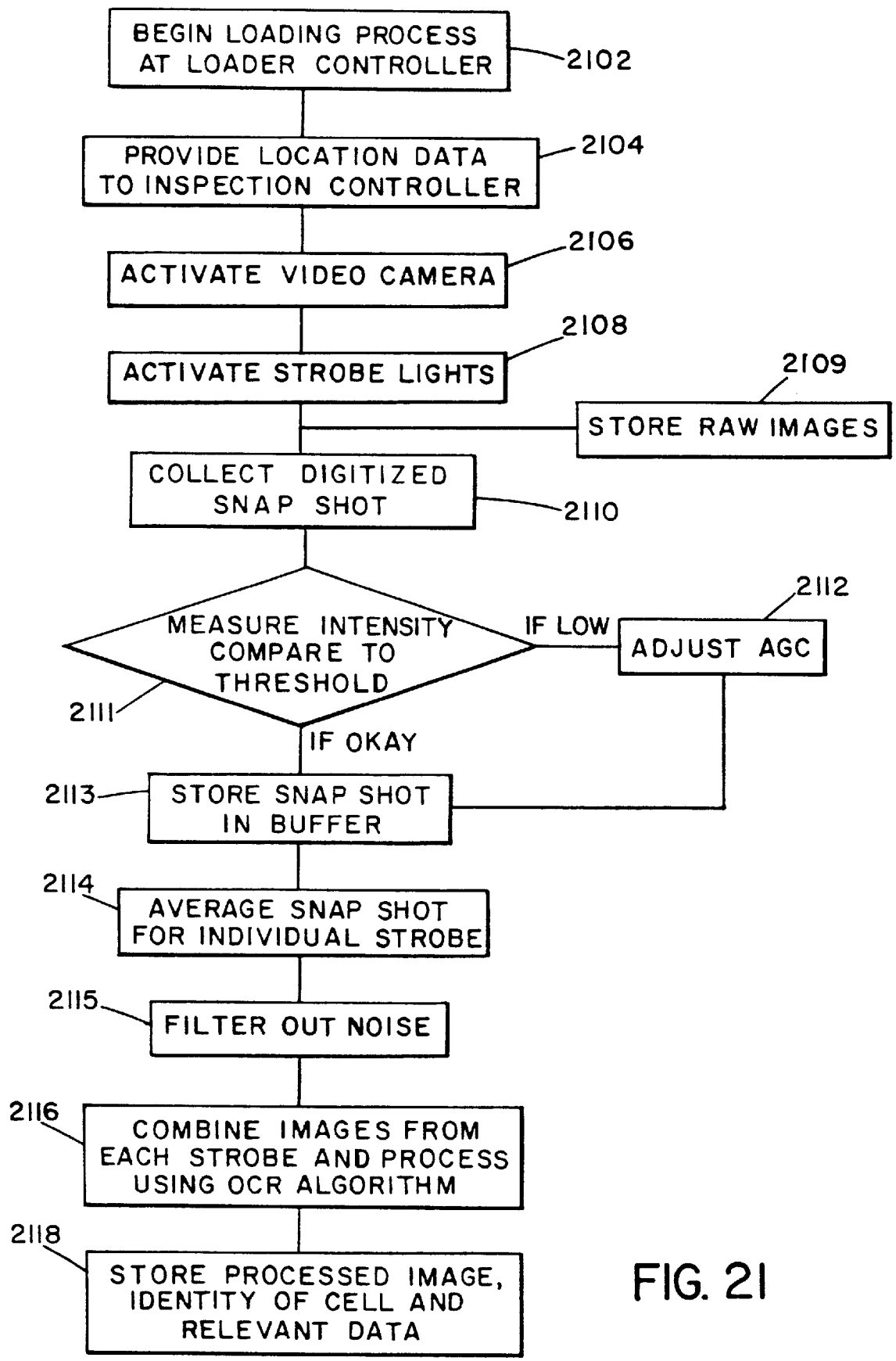
FIG. 21 is a flow chart showing operation of the illumination and imaging system for identification and recording of fuel cell identity and location.

An exemplary sequence of image collection and processing is provided by the simple flow chart in FIG. 21. After starting the procedure by initiating movement of the fuel cell loader to position a fuel cell in step 2102, the imaging and illumination controller receives a signal from the loader controller indicating distance and rate of movement (step 2104). The video camera is activated (step 2106). When a predetermined distance has been traveled, and the first position to be loaded is within the field of view of the camera, the illumination controller initiates operation of the strobe lights (step 2108), alternating illumination of the strobe lights so that only one strobe is illuminating the target at a given time. The pulsed illumination created by the strobe lights causes the video camera to record snap shots of the fuel cell. Each snap shot is digitized and conducted to the image processor (step 2110) which evaluates the image for total light received. (The raw video images may be stored on video tape (step 2109).) If the total light received at the image processor is below a predetermined threshold (step 2111), the automatic gain control (AGC) within the processor will adjust the signal gain to compensate for the reduced signal level (step 2112). The image processor collects and stores in its buffers at least one more snap shot for each illuminator (step 2113), then averages the snap shots to produce an image (step 2114) and filters out incoherent noise that is not consistent between the sequential snap shots (step 2115). (Note that AGC function (step 2112) may be performed before or after storing the images in the buffers, or at any time during the processing of the image signal prior to step 2116. After obtaining the filtered image corresponding to each light source, the processor operates on the combined filtered images using an optical character recognition algorithm to identify the characters of the serial number (step 2116). The digitized image, serial number, location (obtained from the loader controller), date and time are stored in an appropriate, preferably non-volatile, storage medium such as a CD/ROM (step 2118).

Since the imaging process is continuous, the image on the monitor is continually updated. This continual updating enables the operator to slowly move the video camera 22 across an array of fuel cells 36 while identifying each of the cells along the path. The digitized images are stored on an appropriate storage medium for later reference and verification. While magnetic floppy disks or tape may be used, it may be preferable to use a CD/ROM or other less volatile media, particularly in a nuclear facility. Along with the stored images data records of the date, time and location can be stored, providing a complete record of each fuel cell within the facility. In computer systems using multi-task operating systems, such as Windows 95™ or Windows NT™ (Microsoft Corporation, Redmond, Wash.), it may also be possible to supplement the stored data about the fuel cells with an audio record made by reactor personnel during positioning of the cells. For example, if a problem was experienced during the placement of a cell, or unusual conditions were present, a real time record could be dictated and stored in the same storage medium as other fuel cell data.

Figure 3F:
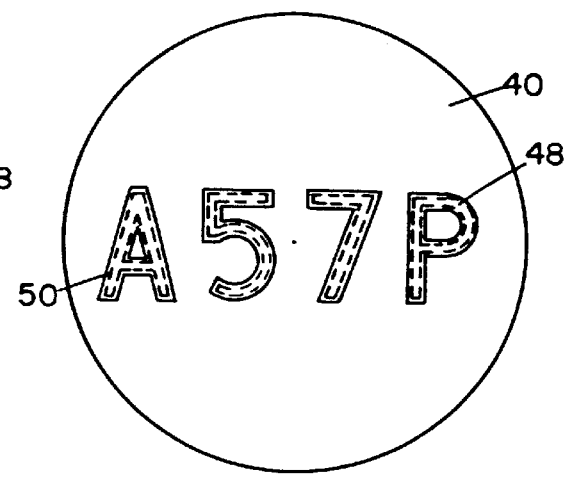

FIGS. 3a–3e represent an alpha-numeric serial number 48 which is embossed on the surface 40 of the fuel cell 36. It should be noted the described method is not limited to alpha-numeric characters, but may be used for imaging of many types of surface transition. For example, FIG. 3f shows the same serial number as the prior figures, yet the alpha-numeric symbols are engraved instead of being embossed. As can be seen, the only difference between the image of an embossed serial number and an engraved serial number is the location of the shadows. When the serial number 48 is embossed, the shadow is on the outside of the alpha-numeric character. When the serial number is engraved, the shadow is on the inside of the alpha-numeric character. Nonetheless, a nearly identical shadow is created by either the embossed or engraved serial number.

Although the imaging and illumination system of the present invention is described in its application to identification of nuclear fuel cells by their alpha-numeric serial number 48, there are many other uses suitable for the inspection system 20. The image enhancement abilities of the present invention may be employed to inspect the condition of the fuel cell. For example, the imaging techniques discussed above would also be useful in analyzing surfaces for cracks and damage which would create one or more edges that would be capable of generating a shadow when illuminated from one or more angles.

Figure 20A:
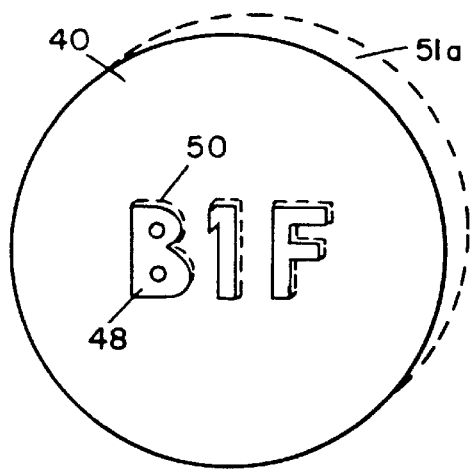
FIGS. 20a–f are diagrammatic views of the fuel cell identification numbers, with FIGS. 20a–c showing a fuel cell with correct leveling as determined using the first, second and third illuminators of a three illuminator system, respectively, and FIGS. 20d–f showing a fuel cell which is improperly leveled as determined using the first, second and third illuminators, respectively.
Figure 20B:
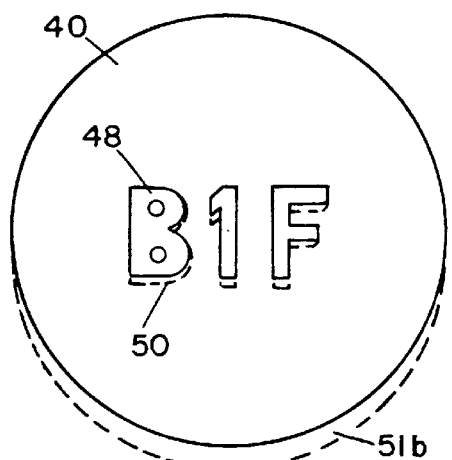
Figure 20C:
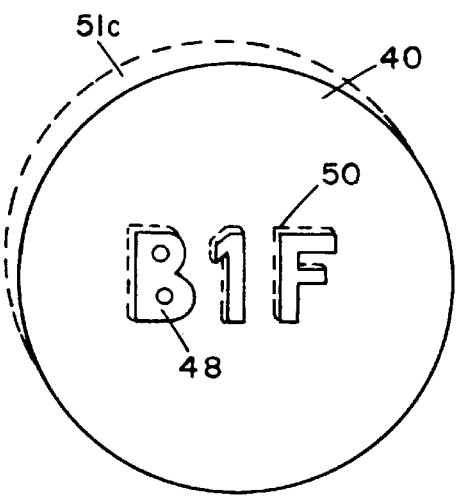
Figure 20D:
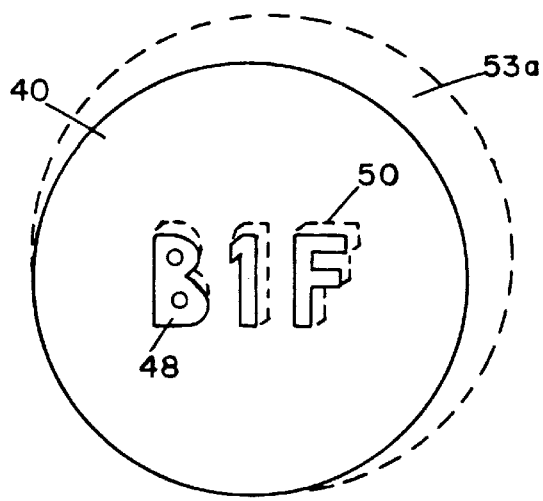
Figure 20E:
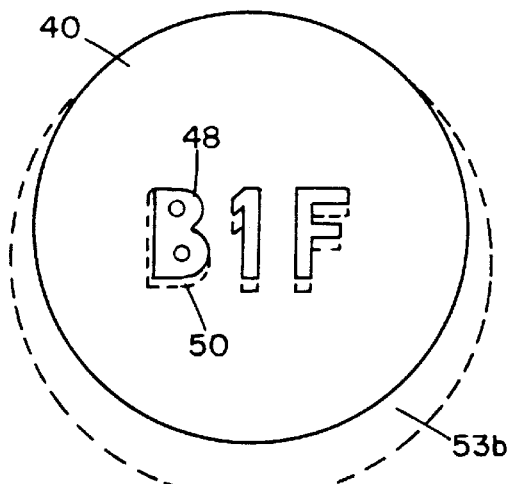
Figure 20F:
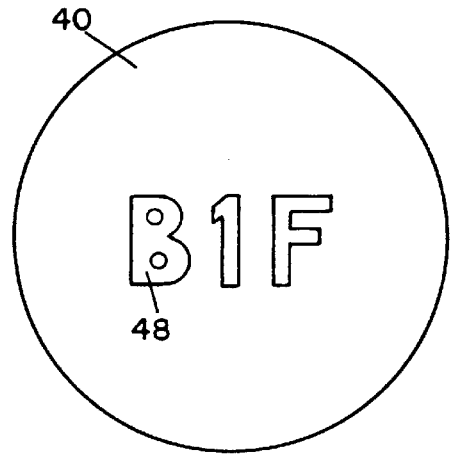

The imaging and illumination system may also be used to determine whether a fuel cell is placed flat against the bottom of the pool, or has been skewed by something underneath the cell, such as a loose bolt or screw. By centering the camera lens 34 over the fuel cell 36 and using the multiple angled illuminators 24 to create shadows along the edges of the cell's top surface, a wider shadow on one side of the cell could be used to indicate a tilt in the cell's positioning. Referring briefly to FIGS. 20a–c, the surface 40 of a properly oriented fuel cell 36 is shown. Note that there are three symmetrical shadows 51a,b,c corresponding to the illumination of each of three illuminators 24. On the other hand, when the fuel cell is not properly oriented, the three shadows corresponding to the illumination of each of the fuel cells are not symmetrical. In fact, the more asymmetrical the shadows, the more severe the displacement of the fuel cell. For example, FIGS. 20d–f represent the shadows formed when the fuel cell is misplaced in the direction of one of the illuminators. As shown, there are two enlarged shadows 53a and 53b in FIGS. 20d and 20e, respectively, which represent the fuel cell being pointed away from those illuminators. No shadow is created in FIG. 20f because the fuel cell is pointing directly at the illuminator.

To provide a proper reference point, it would be preferred to have means for assuring that the plane in which the illuminators are located is parallel to the floor of the pool, e.g., a level, however, comparison of a number of different cells with the plane of the illuminators being kept constant would also provide an indication of how the shadow pattern should appear when a cell is properly positioned on the pool floor. Since the fuel cells are typically four-sided, a four light arrangement may be preferable over a three light configuration using the method described for detecting improper levelling.

With a fixed scan rate and fixed strobe period, for example, in the embodiment of FIG. 16, the imaging and illumination system can be used to measure spacing between fuel cells. The x-y translator for such a purpose would need to have a level of precision which assured that incremental steps were uniform and evenly spaced. A screw-type drive may provide such a level or accuracy. Alternatively, a resistor strip may be placed in the tracks of the x-y translator, such as shown in FIG. 4, which would accurately provide measurements of displacement distance and rate.

Figure 19A:
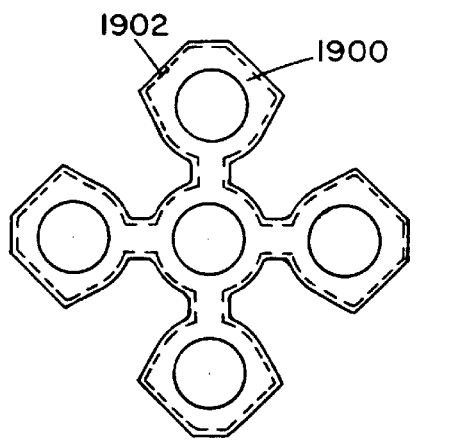
FIGS. 19a–19c are diagrammatic views of fuel cell images at the desired height and level as indicated by a template (FIG. 19a), higher than the desired height (FIG. 19b), and positioned at a tilt relative to the desired height (FIG. 19c)
Figure 19B:
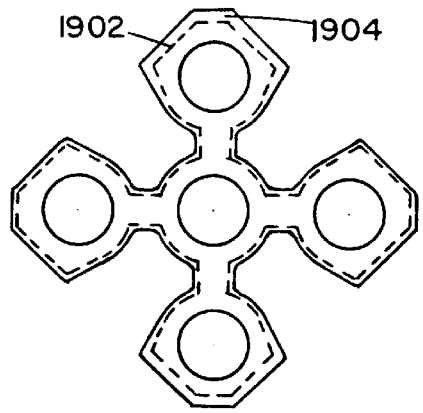
Figure 19C:
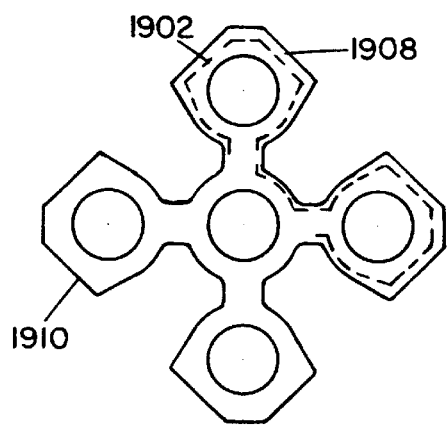

By providing a fixed height of translation of the camera over the fuel cells, an alternative means for determining flatness and leveling may be performed. In this method, the images of the fuel cells may be compared against a template or scale. Since all fuel cells are the same size, variation of the imaged fuel cell from the calibrated template or scale will indicate whether the fuel cell is closer to the camera than it should be. As illustrated in FIG. 19a, image of the fuel cell 1900 is superimposed over a template 1902 (dashed lines) having dimensions that are calculated based upon the height of the camera lens above the cell. Scaling of the image size against the actual fuel cell dimensions, which will be apparent to those in the optical arts, utilizes the known fixed target distance between the camera and the fuel cell, the magnification of the camera lens and the index of refraction of the pool water. The larger image of the fuel cell 1904 as compared to template 1902 (shown as dashed lines) provides an indication that the cell 1904 is lifted away from the surface on which it should be resting. If one side 1908 of the cell 1906 appears larger than the other side 1910 in the image, as shown in FIG. 19c, this is an indication that the cell is not level.

A similar method may be used to determine spacing between cells using two adjacent templates, or a template representing the edges of two separate fuel cells. As above, misalignment of the images cell edges with the template is an indication that the cells are not properly spaced.

Figure 4:
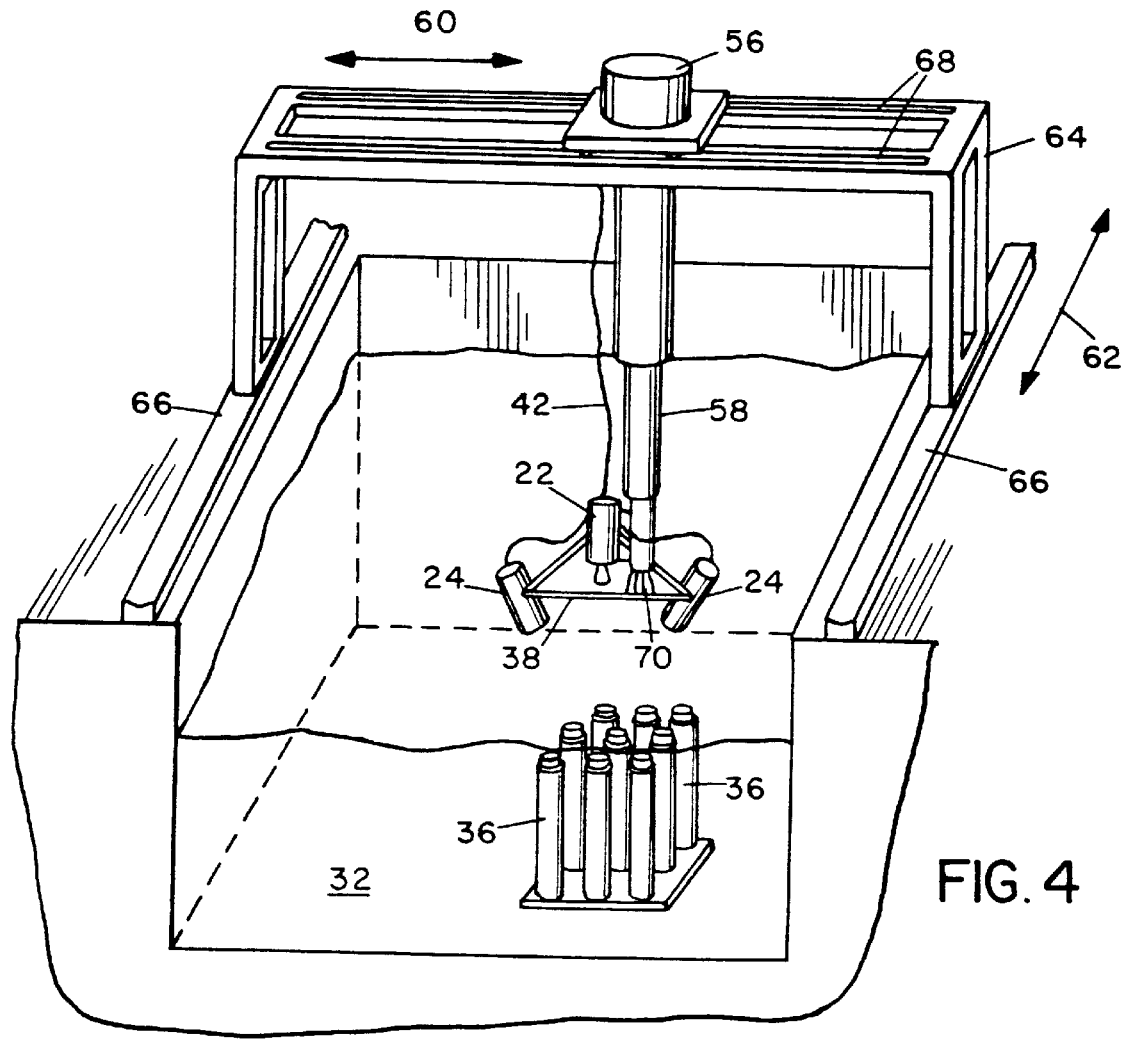
FIG. 4 is a perspective view of the present invention as installed on the fuel handling machine within a nuclear reactor.

Referring now to FIG. 4, the system 20 of the present invention is shown as installed on a fuel handling machine 56 in a nuclear reactor vessel. As alternatives, a separate crane-like structure may be used, the system may be mounted to a hand-held pole or frame, or simply lowered into the reactor pool on its cabling. These alternatives may not provide the positional stability that the preferred use of the fuel handler provides. As shown in FIG. 4, the video camera 22 is attached to the end of the telescoping arm 58 of the fuel handling machine 56. Such mounting insures that the camera 22 is held in a steady position while being moveable in both the x direction 60 and y direction 62. Such x-y movement is accomplished by moving the bridge 64 back and forth in the track 66, and moving the fuel handling machine 56 back and forth on the bridge rails 68. The engagement head 70 on the end of the telescoping arm 58 may be positioned anywhere within the reactor pool 32 thereby accessing every nuclear fuel cell 36 within the pool. Further, since the video camera 22 is adjacent the engagement head 70, every nuclear fuel cell within the pool may be imaged.

The video camera 22 is firmly mounted to the telescoping arm 58 adjacent the engagement head 70 such that the top of a nuclear fuel cell 36 is readily viewable prior to being engaged. This is particularly useful given the penalties which are assessed by the Nuclear Regulatory Commission in the event that a fuel cell is misplaced or misidentified. As an example, FIG. 4 shows a three-by-three array of nuclear fuel cells 36. It should be noted, however, that in either a PWR or BWR, there are possibly thousands of nuclear fuel cells present in the combined containment and spent fuel pools. With such a large number of nuclear fuel cells having various levels of enrichment, it is critical to the proper operation of the reactor that each fuel cells be properly placed.

The system of the present invention provides the ability to identify a particular fuel cell and track its location within the reactor and spent fuel pool. This identification and tracking feature is particularly useful given the time critical nature of the process of refueling a reactor. Since the necessary refueling of a reactor requires that nearly every fuel cell within the reactor be moved or replaced, the time it takes to identify any particular fuel cell is critical. In fact, the act of identifying and manipulating the fuel cells is often the critical path to returning the reactor to service. The stored data can also be used to create a map of the reactor core and spent fuel pools to provide a visual record of the fuel cells.

Figure 5:
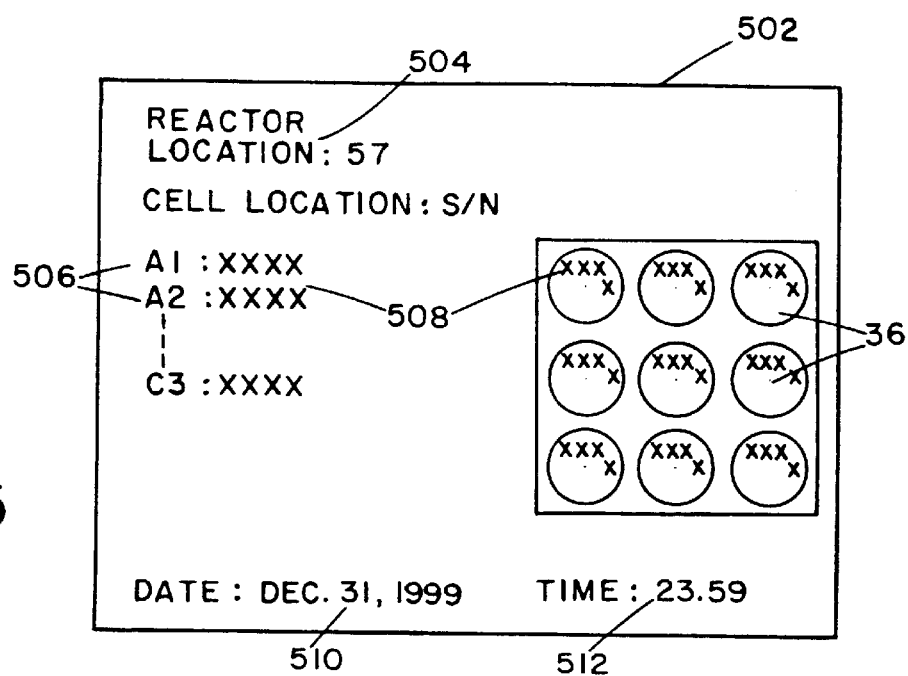
FIG. 5 is a diagram of an exemplary map display generated using the present invention.

FIG. 5 provides an exemplary record 502 of a mapped section of a reactor core as derived from the images generated by the system shown in FIG. 4. Generally, a larger area map of the entire core would be generated using the collected data, so that the area depicted in FIG. 5 represents a "zoomed in" shot of a selected reactor location. An imaginary area in the reactor designated as "Reactor Location 57" (504) shows the images of fuel cells 36, the sub-location coordinate 506 and the serial number 508 for the fuel cell located at that coordinate are displayed, along with the date 510 and time 512 at which the record was made. Hard copy maps and computer-stored files can be maintained as a security measure to provide back-up records. In the computer record, using known searching techniques, a search may be conducted based upon serial number, reactor location, sub-location coordinate, date time, or any other parameter which may be recorded. Using the search, the actual image of the serial number may be displayed along with other relevant information about the fuel cell. The collection of data for generation of the map is preferably done at the time the fuel cells are placed within the reactor core or spent fuel pool. This provides significant time savings as compared to currently practiced methods, which involve placing the fuel cells, then going back and reading the serial numbers to confirm identity and locations of the cells.

Processing of the image data for identification and tracking of fuel cells is accomplished using optical character recognition (OCR) algorithms. OCR-type algorithms work in conjunction with the frame grabber software to compare the real-time image as optimized by the computer system, with the previously stored images of various characters and numerals. As is known in the art, optical character recognition is often implemented using neural networks and other pattern recognition and classification-type computing methods. In the present invention, known pattern recognition methods may similarly be used to increase the speed of character analyses and to compensate for diminished contrast which may arise from varied degrees of deterioration of the identification numbers which, in severe cases, may cause certain portions of the characters to become indistinguishable from the background.

By using the OCR to identify the fuel cells 36 to a high degree of certainty, it is possible to fully automate the process of refueling the reactor. Automating the fuel cell process is accomplished by integrating the image processor, stored fuel cell information databank, and the automated fuel cell handling machine. Thus, once programmed, the system 20 of the present invention could scan a reactor pool 32, identify the fuel cells 36 which need to be removed or relocated, move and relocate the proper fuel cells, and insert any new fuel cells in the proper location.

Because the video camera 22 may include a charge coupled device (CCD) image detector, the radiation exposure of the CCD is of concern. As a result, in an alternative embodiment of the present invention as indicated by the dashed lines in FIG. 1, the video camera 22' is attached to a flexible fiberscope 72 terminating at camera lens 34. The camera lens is fitted with the anchoring bracket 38 for mounting the three illuminators 24a,b,c. This allows the video camera 22' to be located at an increased distance from the radiation source (greater than 1 meter), while the camera lens 34 is positioned close enough to easily view the fuel cells 36. Such an arrangement functions much like the first embodiment, yet may be less susceptible to radiation damage. As described with regard to video camera 22, camera lens 34 is sealed in a water-tight housing 30 and is made of cesium doped glass or similar radiation tolerant optical materials.

In yet another embodiment of the present invention as shown in FIG. 6, a laser scanner 78 is mounted within a water-proof housing 30 and directed to emit a laser beam 80 in a fan pattern. The fan pattern may be achieved by scanning a single beam spot in a raster pattern, or by creating a spreading beam by refracting the emitted beam, typically using a cylindrical lens. In either case, the fan pattern produces a line of illumination at the surface to permit a series of parallel scans over the surface of the fuel cell 36. A multi-pixel detector 82 (indicated with dashed lines) is mounted within the housing 30 and is tuned to detect the intensity of the reflected laser light. The output from the detector 82 is electrically communicated to the computer system 44 where the signal is analyzed for intensity variations. As the laser beam 80 is scanned over the surface of the fuel cell 36, the intensity of the return signal varies as a result of the surface displacements present.

Referring to FIGS. 7a–h, the return signal strength for a series of sweeps of the laser are represented graphically. By comparing the location of the laser beam 80 to the intensity of the reflected beam, the edges of any contour may be determined. Referring first to FIG. 7a, the first sweep of the laser across the alpha-numeric character 84 of FIG. 8 is shown as a constant intensity with the exception of decreasing intensities 86 at the edges of the character. Similarly, in FIG. 7b, the second sweep of the laser across the alpha-numeric character 84 shows two areas of decreasing intensity. Further, FIGS. 7c–7j represent successive scans across the character of FIG. 8 yielding a series of measurement profiles. These profiles, when combined into a single view as shown in FIG. 7j, provide sufficient information for recognition of the alpha-numeric character 84 being scanned. In this manner, the serial number 48 of a fuel cell 36 may be determined to a high level of accuracy. It should be noted that the image in FIG. 7j appears to have a fairly low resolution due to the relatively small number of scans 7a–7j which used in illustration of this procedure. In practical applications, the laser would make a large number of passes per area, giving rise to a much higher resolution.

One technique for using the laser scan output is to combine the return signal intensity plots for all scan traces into one video screen image. By combining all of the signals in real time, the operator of the system may simply view the video screen as the mast 88 with the laser scanner mounted on it slowly passes over the surfaces of the fuel cells. Also, if the laser scanner 76 is mounted to the telescoping arm 58 like the video camera 22, the laser scanner could provide real-time video information for the fuel handling machine operator, thereby improving both the efficiency and accuracy of fuel cell handling.

Figure 9:
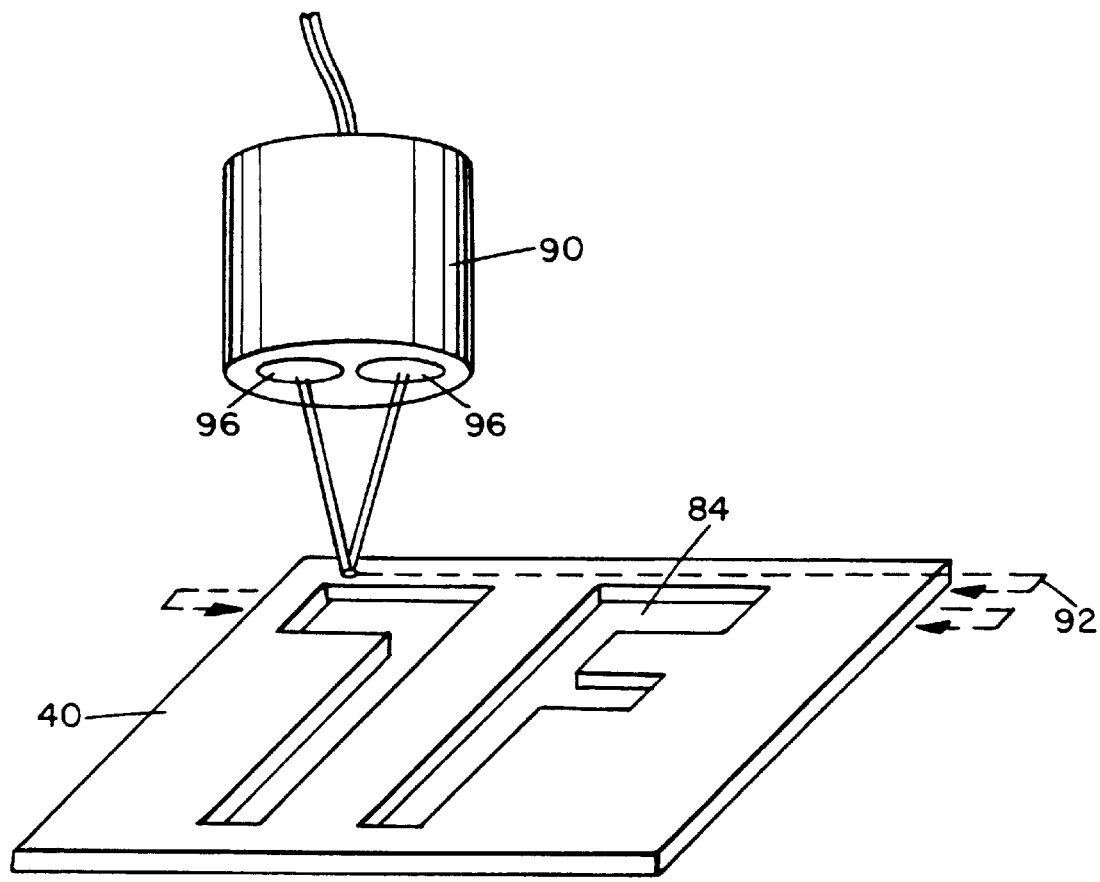
FIG. 9 is a diagrammatic view of a fourth embodiment of the present invention incorporating a laser distance device for measuring distances.

In another alternative embodiment of the present invention, a distance measuring laser 90 may be employed to determine the overall topography of the surface 40 of the fuel cell 36. Referring to FIG. 9, a distance measuring laser device 90 is shown positioned over engraved alpha-numeric characters 84. The laser is gradually moved in a sweeping pattern over the surface 40 of the characters as indicated by the direction markings 92. As the laser is moved over the character, the laser emitter 94 emits brief pulses of light which strike the surface 40 of the fuel cell 36 and are reflected back to the detector 96. Once the detector senses the reflected laser signal, precise timing measurements are performed which translate the travel time from the laser emitter 94 to the laser detector 96 into a distance. For each pulse emitted, a corresponding distance is calculated and stored in a memory buffer along with the x-y coordinate of the laser device 90.

Figure 10:
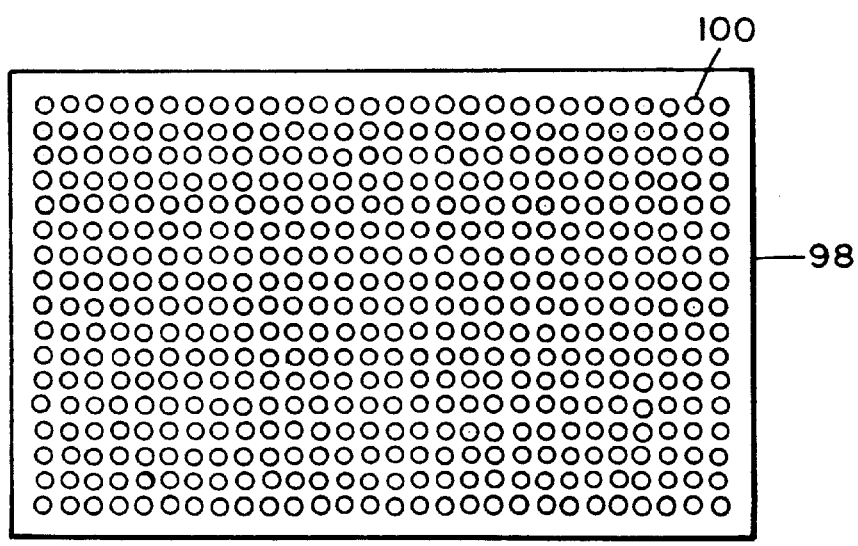
FIG. 10 is a computer generated image of the top of the fuel cell using the distance information.

Once the entire surface 40 of the fuel cell 36 has been covered, the distance value in the memory buffer is scaled to provide a distinction between the longest and shortest distance. Once distinguished, the range of distances is partitioned into a number of finite distance ranges having specific limits. Each of these ranges is given a different color which corresponds only to measurements taken which fit within the particular range. Then, using both the x-y information and the color-coded distance range, a topographical image 98 of the fuel cell surface 40 is displayed on the computer monitor 54. FIG. 10 represents the topographical color-coded mapping 98 of the surface of a fuel cell shown in FIG. 9. The number of pulses per inch, or pulses per second if the laser device is moving, will yield topographical images of varying resolutions. In the present example, there were a sufficient number of samples 100 taken to accurately determine the characters representing the fuel cell's serial number.

While using this method of topographical scanning, it is critical that the laser device 90 be maintained at a constant height. This can be accomplished, to some degree, by securely mounting the laser device to the end of the telescoping arm 58 on the fuel handling machine 56. On the other hand, such stability may be achieved using other types of mounting devices. Such devices could include a pool-bottom inspection system or similar platform. Alternatively, the laser and optics could be mounted on a stable track positioned above the water's surface, thus assuring a fixed relationship between the scanning device and the cells on the pool bottom.

In addition to being able to accurately determine the topography of a fuel cell surface 40, the laser device 90 may also be used to determine the height of the fuel cell 36 in relationship to the height of other fuel cells. As before, the stability of the platform is critical in order to secure accurate height measurements of the fuel cells. However, due to the importance of the fuel cells being at the proper height, such platform stability is not a significant obstacle. This importance arises from the fact that an improperly positioned fuel cell is subject to damage when the control rod assembly is placed over the fuel cells. In fact, in severe cases, fuel cells have been known to be crushed, requiring that the reactor be completely shut down for an extended period of time required for cleanup of the damaged cell. Reasons for raised fuel cells are numerous, but include dislodged hardware being beneath the cell as well as cells that are not well seated in the fuel cell holding tray.

The height determination of the fuel cells 36 would be achieved similarly to the topography of the fuel cell surface. However, instead of performing a high-resolution scan of a small area, a larger area will be covered. This larger area will include several dozen fuel cells. Thus, by creating a color-coded image as above, the relative heights of the fuel cells can be easily determined. In fact, by scanning the entire reactor pool, any fuel cell that is higher than the rest will be readily noticed on the color display.

In yet another embodiment of the present invention, the topography of the fuel cell surface may be determined using an interferometer. There are two basic types of interferometers: one based on the Michelson design, and another based on the Fabry-Perot design, and either design will work in this application, as discussed below. In general, an interferometer combines two beams of light from the same source in a manner which creates a series of interference lines, commonly called the interference pattern. An interference pattern typically appears on a flat surface as a number of concentric circles. These circles, however, are deformed when the distance between the interferometer and the surface changes. It is this feature which particularly suits interferometers for determining the topography of a fuel cell surface 40.

In the Michelson interferometer, as shown in FIG. 11, a single light beam 102 is split into two sets of waves 104a,b by a beam splitter 106. The two waves 104 are sent to two fully silvered mirrors 108, 110 and the reflected waves 120 are then recombined. The resulting light intensity produced by the reflected waves 120 as they interfere with one another produces bright and dark bands, commonly called fringes, when the waves add and cancel. The visibility of the fringes, i.e., the contrast between the bright and dark bands, depends on the spectral purity of the light beam, such that a laser emitting within a narrow band will be preferred. The position of the fringes in the Michelson interferometer is sensitive to small changes in the positions of the mirrors 108, 110 such that it measures the lengths of the paths traveled by the two light waves to an accuracy of better than one wavelength of light. While useful to measure the precise distances the two beams of light traveled, the Michelson interferometer in the present invention is used simply to create an interference pattern.

Referring now to FIG. 12, an interferometer is enclosed in a waterproof housing 30 and positioned such that the laser source 102, two mirrors 108, 110, and beamsplitter 106 project an interference pattern 122 downward. The housing 30 is submerged into the pool 32 and positioned above a fuel cell 36 to be identified. Once the interference pattern 122 is created and projected onto the fuel cell surface 40, by observing the deformations in the pattern, the topography of the fuel cell surface may be determined.

Referring now to FIG. 13, an interference pattern is projected onto the surface 40 of the fuel cell 36. By viewing the surface of the fuel cell through the video camera 22, or camera lens and fiberscope, the topographical characteristics of the surface may be easily determined since any distance variation from the interferometer will disrupt the interference pattern 122, including distances approximating the wavelength of the laser. As a result, even the most minute surface changes on the fuel cell are clearly visible. FIG. 13 shows the deformation of the interference pattern as a result of the engraved alpha-numeric characters 84. The alphanumeric characters disrupt the otherwise smooth interference lines 122 because the inner areas of the characters represent a height difference much greater than the wavelength of the laser, resulting in disrupted interference patterns for the character portion of the surface. Thus, the characters are clearly visible on the surface 40 of the fuel cell 36, despite their being partially filled with corroded particles (not shown) and despite the fact that visual contrast is poor.

In the Fabry-Perot interferometer as shown in FIG. 14, two mirrors 124, 126 are parallel to each other so the light emitted from a light source 128 reflects many times back and forth between mirrors 124, 126. Only a restricted group of wavelengths of light survive the interference on so many multiple reflections. However, those wavelengths that do survive pass through the mirror 126 and are spread by lens 130 to create an interference pattern 132.

The Fabry-Perot interferometer is particularly suited for creating interference patterns and, as such, is the preferred interferometer embodiment of the present invention. As long as the interference pattern is being generated, there is little distinction between the Michelson and Fabry-Perot interferometers, and it would be difficult for the operator of the fuel handling system to determine which interferometer was being used.

In yet another embodiment of the present invention, holographic interferometry is used to observe the surface topography of the fuel cells 36. In order to apply holographic interferometry, there must be an original hologram of the image to be analyzed. While this might be somewhat difficult to create, the results from holographic interferometry are useful both in surface topography as well as character recognition.

Figure 15:
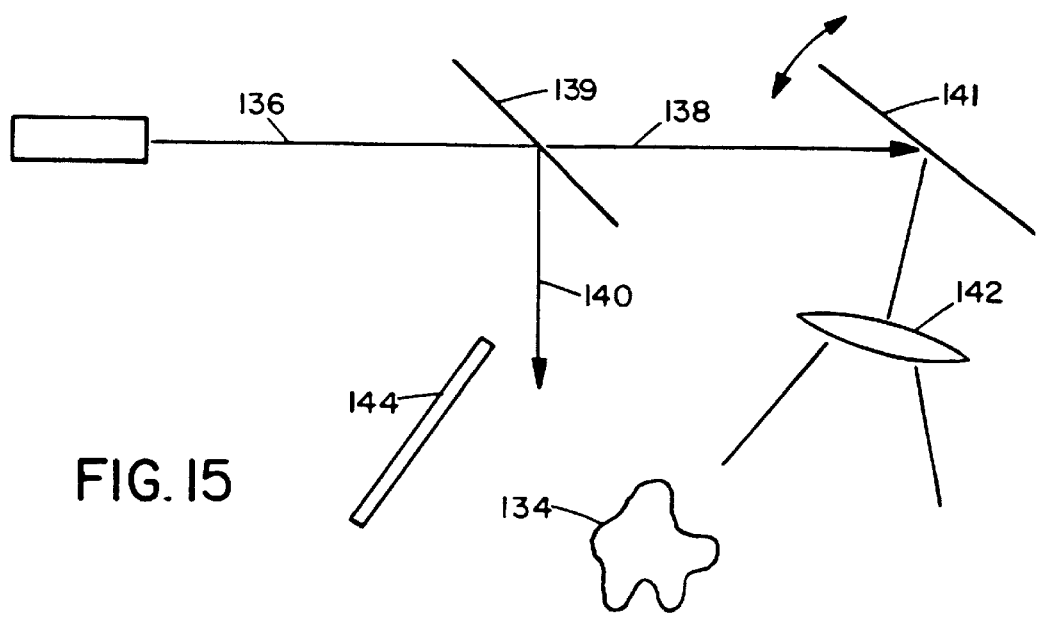
FIG. 15 is a diagrammatic view showing how to create a hologram using a single light source.

In order to use holographic interferometry, a hologram of the fuel cell must be created. FIG. 15 shows how a typical hologram is created using the object being imaged 134 and illuminating it with light from a single laser beam 136 split into a first beam 138 and a second beam 140, by a partially silvered mirror 139. The first beam 138 is reflected by mirror 141 and passes through a diverging lens 142 to illuminate the object being recorded. The second beam 140 shines directly on the object being recorded and the reflection from both beams is recorded on a photographic material 144. Such materials include, for example, silver halide photographic emulsions, alkali halides, photoresists, photochromic glasses, and dichromated gelatine.

Once the hologram has been made, there are several options available to use the created image for topographical information. For example, using live fringe interferometry, once a hologram is made and replaced in its original position with respect to the object and reference and reconstruction beams, the virtual image produced is superimposed on the original object. If the original object continues to be illuminated with laser light, any deformation it may suffer subsequent to the making of the hologram will be revealed as interference fringes localized on or near the object.

Alternatively, using contour generation, a set of contours can be generated over the surface of a reconstructed object by making a hologram with two different wavelengths $\lambda_1$ and $\lambda_2$ simultaneously. When a reconstructing beam of the first wavelength is used, two object wavefronts are produced, one giving an image of unit magnification and another of some slightly different magnification. The two different wavefronts then interfere to generate contours where height interval h is determined by the following relationship $$h = \frac{\lambda_1^2}{\lambda_1 - \lambda_2}$$

where $\lambda_1$ is the wavelength of the first light source, and $\lambda_2$ is the wavelength of the second light source. From this equation, it is seen that even a small wavelength difference translates into a large height change. Thus, even if the two beams of light are relatively close to the same frequency, their interference pattern will still identify a very small height difference.

As applied in the present embodiment, holographic interferometry provides for excellent topographical information determination, as well as automatic fuel cell identification.

It will be evident that there are additional embodiments which are not illustrated above but which are clearly within the scope and spirit of the present invention. The above description and drawings are therefore intended to be exemplary only and the scope of the invention is to be limited solely by the appended claims.

We claim:

1. A system for inspection of fuel cells within a nuclear facility pool, the fuel cells being spaced apart from adjacent fuel cells at a cell spacing, and having a fuel cell surface with a plurality of edges and a plurality of height variations relative to a background area, the system comprising:

at least one illumination source for emitting a pulsed light to impinge upon the fuel cell surface at a predetermined location within the nuclear facility pool so that an optically-detectable contrast is created by at least one of the plurality of height variations a camera disposed along an optical path intersecting the fuel cell surface for receiving and detecting light reflected from the fuel cell surface and for generating a digital image signal representative of an image of the reflected light;

a timing controller for generating a time signal for synchronizing the activation of each illumination source with detection of reflected light by the camera;

a processor for generating a processed image connected to the camera and the at least one illumination source, the processor including an image processor for receiving and processing the digital image signal to enhance the optically-detectable contrast; and a storage medium in communication with the processor for storing the processed image and a designation corresponding to the predetermined location within the nuclear facility pool.

2. The system of claim 1, wherein a portion of the plurality of height variations comprises a plurality of alphanumeric characters imprinted on the fuel cell surface and wherein the processor further includes a character recognition algorithm for operating on the processed image to determine an identity for each of the plurality of alphanumeric characters.

3. The system of claim 1, wherein the at least one illumination source comprises a plurality of light sources, each light source being disposed at an angle with respect to the optical path so that the illuminating light impinges upon the fuel cell surface at an angle to create a shadow corresponding to the plurality of height variations in the fuel cell surface.

4. The system of claim 3, wherein the plurality of light sources is disposed within a circle perpendicular to and centered on the optical path, each light source being separated from an adjacent light source by an angle within the range of 90° and 120°.

5. The system of claim 3, wherein the each light source is a flash lamp for producing pulses of light.

6. The system of claim 5, wherein the flash lamp is formed using quartz tubing.

7. The system of claim 1 wherein the timing signal activates each light source at different times from other light sources of the plurality.

8. The system of claim 7, wherein each light source is a strobe light and the timing signal activates each strobe light in an alternating sequence.

9. The system of claim 8, wherein the camera generates a snap shot of the fuel cell surface corresponding to an activation of each strobe light.

10. The system of claim 9, wherein the image processor combines a plurality of snap shots from a plurality of activations of each strobe light to generate a filtered image signal.

11. The system of claim 10, wherein the image processor combines the filtered image signals corresponding to each strobe light to generate the processed image.

12. The system of claim 1, wherein each of the at least one illumination source and the camera are constructed using radiation tolerant materials.

13. The system of claim 1, further comprising a location detection means for generating a location signal indicative of the predetermined location within the nuclear facility pool, the location detection means connected to the processor for providing the location signal for storage of the designation corresponding to the predetermined location in the storage medium.

14. A system of claim 1, wherein a transition between the edges of two adjacent fuel cells and the cell spacing therebetween comprise a second portion of the plurality of height variations within the fuel cell surface, and wherein the camera is positioned at a known height above the fuel cell surface and the processor further includes calibration means for measuring the cell spacing from the processed image.

15. A system of claim 1, wherein a plurality of edges of a single fuel cell comprise a third portion of the plurality of height variations in the fuel cell surface, wherein the camera is positioned at a known height above the fuel cell surface and the processor further includes calibration means for measuring a cell size.

16. A system for inspection of a plurality of surfaces submerged at a predetermined location within a nuclear facility pool, the plurality of surfaces having a topography comprising a plurality of raised areas and lowered areas, the system comprising:

a plurality of light sources for emitting an illuminating light to impinge upon the of the plurality of surfaces, each light source comprising a strobe light disposed at an angle with respect to an optical path that is substantially perpendicular to the plurality of surfaces so that a transition between a raised area and a lowered area of the plurality of raised and lowered areas is visually enhanced;

a timing controller for selectively activating the light sources one at a time;

a camera disposed along the optical path above the plurality of surfaces for receiving and detecting an image of the transition when illuminated by each light source and for generating a digital image signal representative of the image;

a processor including an image processor for receiving the digital image signal corresponding to illumination by each light source and for combining and processing the digital image signals to generate a processed image of the topography; and a storage medium for storing the processed image and a corresponding set of data identifying the selected location within the pool.

17. The system of claim 16, wherein plurality of raised areas and lowered areas are alphanumeric characters imprinted into a background area, the processor further including a character recognition algorithm for operating on the processed image to identify the alphanumeric characters, and wherein the storage medium is further used for storage of the identities of the alphanumeric characters.

18. The system of claim 16, wherein the plurality of raised areas and lowered areas comprises a plurality of fuel cells and a plurality of gaps therebetween, respectively, the processor further including calibration means for measuring a gap size within the plurality of gaps from the processed image.

19. The system of claim 16, wherein the plurality of raised areas and lowered areas comprises an upper surface of a fuel cell, the raised areas corresponding to an upwardly tilt of the upper surface and the lower areas corresponding to a downward tilt of the upper surface.

20. The system of claim 16, wherein the plurality of light sources is disposed within a plane perpendicular to and centered on the optical path, each light source being separated from an adjacent light source by an angle within the range of 90° and 120°.

21. The system of claim 16, further comprising a timing controller for selectively activating the strobe lights one at a time.

22. The system of claim 21, wherein the strobe light includes a quartz flash lamp.

23. The system of claim 21, wherein the camera generates a snap shot corresponding to each activation of the strobe lamp.

24. The system of claim 23, wherein the processor combines a plurality of snap shots for generating the processed image.

25. A method for inspecting fuel cells submerged within a containment pool, the fuel cells being spaced apart from adjacent fuel cells at a cell spacing, and having a fuel cell surface with a plurality of edges, each fuel cell having a plurality of height differentials in the fuel cell surface relative to a background area, the method comprising:

positioning a camera over the fuel cells at a known distance;

illuminating the upper surface of the fuel cells using a plurality of light sources, each light source being positioned to emit light at an angle relative to the upper surface so that shadows are formed by the plurality of height differentials, and each light source being separated form other light sources so that a different set of shadows is formed corresponding to each light source;

capturing an image of the shadows generated by each light source; and combining and image processing the images of the shadows from the plurality of light sources to generate an enhanced image.

26. The method of claim 25, wherein each light source is a strobe light, and the plurality of light sources is activated one-at-a-time in a sequence so that each activation results in a snap shot of the shadows.

27. The method of claim 25, wherein the step of positioning a camera over the fuel cells comprises attaching the camera to a fuel cell handling system for positioning the fuel cells within the containment pool.

28. The method of claim 25, wherein a portion of the plurality of height differentials corresponds to a plurality of alphanumeric characters of a serial number imprinted on the fuel cell surface, and further comprising the step of performing an optical character recognition algorithm on the enhanced image to determine the serial number of each said fuel cell.

29. The method of claim 25, wherein the plurality of height differentials includes a second portion of height differentials corresponding to a transition between the edges of two adjacent fuel cells and the cell spacing therebetween, the method further comprising determining a calibration factor for measuring a distance of the cell spacing from the enhanced image.

30. The method of claim 25, wherein the plurality of height differentials includes a third portion of height differentials corresponding to a tilted fuel cell wherein one edge of the tilted fuel cell is higher than another edge, the method further comprising a means for determining that the one edge of the tilted fuel cell is closer to the camera.

31. The method of claim 25, wherein the steps of illuminating the upper surface, capturing an image and combining and image processing the images are performed during a fuel cell loading procedure in the containment pool.

32. The method of claim 25, further comprising storing the enhanced images in a computer memory along with fuel cell identification and location data.

33. The system of claim 1, further comprising a fuel cell handling mechanism, wherein at least one element of said system for inspection of fuel cells is attached to said fuel cell handling mechanism, and wherein said fuel cell handling mechanism is adapted to provide input data to the storage medium with the designation corresponding to the predetermined location within the nuclear facility pool.

34. The system of claim 16, wherein the camera and the plurality of light sources are mounted on a fuel cell handling machine.

35. A method for inspection of a plurality of surfaces submerged within a nuclear facility pool at a predetermined location, the plurality of surfaces having a topography comprising a plurality of raised areas and lowered areas, the method comprising:

illuminating the plurality of surfaces using a plurality of light sources so that a transition between a raised area and a lowered area of the plurality of raised and lowered areas is visually enhanced, each light source comprising a strobe light;

one at a time, selectively activating a timing controller for the light sources;

positioning a camera having a field of view of the surface;

detecting an image of the transition when illuminated by each light source;

generating a digital image signal representative of the transition image;

combining the digital image signal corresponding to illumination by each light source and processing the combined digital image signals to generate a processed image of the topography; and storing in a storage medium the processed image and a corresponding set of data identifying the selected location within the pool.

36. The method of claim 35, wherein the plurality of raised areas and lowered areas are alphanumeric characters imprinted into a background area, and further comprising the steps of:

processing the combined digital image signals to identify the alphanumeric characters; and storing in the storage medium the identities of the alphanumeric characters.

37. The method of claim 35, wherein the plurality of light sources and the camera are mounted on a fuel cell handling machine.

* * * * *